United States Patent
Fan et al.

(10) Patent No.: US 10,516,988 B2
(45) Date of Patent: Dec. 24, 2019

(54) PROFILE PROCESSING METHOD, PROFILE PROCESSING APPARATUS, USER TERMINAL, AND EUICC

(71) Applicant: Huawei Technologies Co., Ltd., Shenzhen (CN)

(72) Inventors: Shunan Fan, Beijing (CN); Shuiping Long, Beijing (CN); Linyi Gao, Beijing (CN); Xiaobo Yu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/759,398

(22) PCT Filed: Sep. 11, 2015

(86) PCT No.: PCT/CN2015/089475
§ 371 (c)(1),
(2) Date: Mar. 12, 2018

(87) PCT Pub. No.: WO2017/041306
PCT Pub. Date: Mar. 16, 2017

(65) Prior Publication Data
US 2018/0255451 A1    Sep. 6, 2018

(51) Int. Cl.
*H04B 1/38*    (2015.01)
*H04W 8/20*    (2009.01)
(Continued)

(52) U.S. Cl.
CPC ............ *H04W 8/20* (2013.01); *H04B 1/3816* (2013.01); *H04W 12/08* (2013.01); *H04W 88/02* (2013.01)

(58) Field of Classification Search
CPC ........ H04W 8/20; H04W 12/08; H04W 88/02; H04B 1/3816
(Continued)

(56) References Cited

U.S. PATENT DOCUMENTS 6,567,849 B2 * 5/2003 Ludovici ............. H04L 41/0253
709/220
8,560,015 B2 * 10/2013 Holtmanns ............. H04W 4/60
455/558
(Continued)

FOREIGN PATENT DOCUMENTS

CN    103141126 A    6/2013
CN    103813302 A    5/2014
(Continued)

OTHER PUBLICATIONS

Machine Translation and Abstract of Chinese Publication No. CN103974250, Aug. 6, 2014, 49 pages.
(Continued)

*Primary Examiner* — April G Gonzales
(74) *Attorney, Agent, or Firm* — Conley Rose, P.C.

(57) ABSTRACT

A profile processing method, a profile processing apparatus, a user terminal (UE), and an embedded universal integrated circuit card (eUICC) conducive to profile processing efficiency enhancement of the eUICC and user experience improvement, where the method includes generating, by a local profile assistant (LPA) of a first UE (UE1), a profile request according to information about an eUICC of a second UE (UE2), sending the profile request, receiving, by the LPA, a profile request response, where the profile request response includes at least a profile of the eUICC, and forwarding, by the LPA, the profile to the eUICC.

20 Claims, 6 Drawing Sheets

(51) Int. Cl.
*H04W 12/08* (2009.01)
*H04B 1/3816* (2015.01)
*H04W 88/02* (2009.01)

(58) Field of Classification Search
USPC .......................................................... 455/558
See application file for complete search history.

(56) References Cited

U.S. PATENT DOCUMENTS

| | | | | |
|---|---|---|---|---|
| 9,549,313 B2* | 1/2017 | Park | ...................... | H04W 12/04 |
| 9,788,190 B2* | 10/2017 | Park | ...................... | H04L 63/0853 |
| 9,928,379 B1* | 3/2018 | Hoffer | ................. | G06F 21/6245 |
| 2010/0125732 A1* | 5/2010 | Cha | ...................... | H04L 63/107 |
| | | | | 713/166 |
| 2011/0004762 A1* | 1/2011 | Horn | ...................... | H04W 12/04 |
| | | | | 713/171 |
| 2011/0035592 A1* | 2/2011 | Cha | ...................... | H04L 63/205 |
| | | | | 713/169 |
| 2013/0097682 A1* | 4/2013 | Zeljkovic | .............. | H04L 9/3231 |
| | | | | 726/7 |
| 2013/0132283 A1* | 5/2013 | Hayhow | ............ | G06Q 20/1085 |
| | | | | 705/67 |
| 2013/0205134 A1 | 8/2013 | Holtmanns et al. | | |
| 2013/0227646 A1* | 8/2013 | Haggerty | ............ | H04L 63/0853 |
| | | | | 726/3 |
| 2013/0340040 A1* | 12/2013 | Park | ........................ | H04L 63/08 |
| | | | | 726/3 |
| 2013/0344864 A1* | 12/2013 | Park | ........................ | H04W 8/18 |
| | | | | 455/432.3 |
| 2014/0031012 A1* | 1/2014 | Park | ...................... | H04W 12/06 |
| | | | | 455/411 |
| 2014/0045460 A1* | 2/2014 | Park | ...................... | H04W 8/205 |
| | | | | 455/411 |
| 2014/0134996 A1* | 5/2014 | Barclay | ................. | H04W 24/08 |
| | | | | 455/422.1 |
| 2014/0219447 A1* | 8/2014 | Park | ...................... | H04W 12/08 |
| | | | | 380/247 |
| 2014/0235210 A1* | 8/2014 | Park | ...................... | H04W 12/04 |
| | | | | 455/411 |
| 2014/0357229 A1* | 12/2014 | Lee | ....................... | H04W 12/04 |
| | | | | 455/411 |
| 2015/0237496 A1* | 8/2015 | Gao | ...................... | H04W 12/06 |
| | | | | 455/414.1 |
| 2016/0012465 A1* | 1/2016 | Sharp | ..................... | G06Q 20/18 |
| | | | | 705/14.17 |
| 2016/0014601 A1* | 1/2016 | Mellqvist | .............. | H04W 12/06 |
| | | | | 455/411 |
| 2016/0020804 A1* | 1/2016 | Lee | ....................... | H04B 1/3816 |
| | | | | 455/558 |
| 2016/0021529 A1* | 1/2016 | Park | ...................... | H04W 8/205 |
| | | | | 455/410 |
| 2016/0048640 A1* | 2/2016 | Chung | .................. | G06F 19/328 |
| | | | | 705/3 |

FOREIGN PATENT DOCUMENTS

| | | |
|---|---|---|
| CN | 103974250 A | 8/2014 |
| DE | 202015102198 U1 | 5/2015 |
| GB | 2522044 A | 7/2015 |
| WO | 2012042300 A1 | 4/2012 |
| WO | 2014095040 A1 | 6/2014 |
| WO | 2015085571 A1 | 6/2015 |

OTHER PUBLICATIONS

Machine Translation and Abstract of German Publication No. DE202015102198, May 28, 2015, 65 pages.
Foreign Communication From a Counterpart Application, PCT Application No. PCT/CN2015/089475, English Translation of International Search Report dated Jun. 7, 2016, 3 pages.
Foreign Communication From a Counterpart Application, PCT Application No. PCT/CN2015/089475, English Translation of Written Opinion dated Jun. 7, 2016, 4 pages.
Park, J., et al.,"Secure Profile Provisioning Architecture for Embedded UICC," XP032524210, International Conference on Availability, Reliability and Security, Sep. 2, 2013, pp. 297-303.
"Embedded SIM Remote Provisioning Architecture," XP055218410, Version 1.1, GSM Association, Dec. 17, 2013, 84 pages.
Foreign Communication From a Counterpart Application, European Application No. 15903411.5, Extended European Search Report dated Jun. 19, 2018, 10 pages.
Foreign Communication From a Counterpart Application, Chinese Application No. 201580082999.1, Chinese Office Action dated Aug. 8, 2019, 9 pages.

* cited by examiner

PROFILE PROCESSING METHOD, PROFILE PROCESSING APPARATUS, USER TERMINAL, AND EUICC

CROSS-REFERENCE TO RELATED APPLICATION

This application is a U.S. National Stage of International Patent Application No. PCT/CN2015/089475 filed on Sep. 11, 2015, which is hereby incorporated by reference in its entirety.

TECHNICAL FIELD

The present disclosure relates to the field of wireless communications technologies, and in particular, to a profile processing method, a profile processing apparatus, a user terminal (UE), and an embedded universal integrated circuit card (eUICC).

BACKGROUND

An eUICC may also be referred to as an embedded subscriber identity module (SIM) (eSIM) card, and is a new security element that is defined in the industry and can be used by multiple communications operators to remotely manage subscribers. At present, a local profile assistant (LPA) module is provided in a UE in an architecture defined in a mainstream standard. The LPA module is configured to discover subscription manager-secure routing (SM-SR), download and manage a profile, and provide a user interface (UI) interface to an end user, for the end user to manage (i.e., activate, disable, and delete) a profile in an eUICC.

At present, one UE has one eUICC. For UE that does not have an LPA module or a network access capability, display and selection of operator information, and profile download, profile management, or the like of a corresponding eUICC can be implemented only using a device other than the UE, such as a computer, or in an operator service center, or in an online service center. This causes complex operation processes.

SUMMARY

Embodiments of the present disclosure provide a profile processing method, a profile processing apparatus, a UE, and an eUICC to enhance profile processing efficiency of an eUICC and improve user experience.

A first aspect of the embodiments of the present disclosure provides a profile processing method, including generating, by an LPA of a first terminal (UE1), a profile request according to information about an eUICC of a second terminal (UE2), and sending the profile request, receiving, by the LPA, a profile request response, where the profile request response includes at least a profile of the eUICC, and forwarding, by the LPA, the profile to the eUICC.

In a first possible implementation of the first aspect of the embodiments of the present disclosure, sending, by an LPA, the profile request includes sending, by the LPA, the profile request to a profile server.

With reference to the first aspect of the embodiments of the present disclosure or the first possible implementation of the first aspect, in a second possible implementation of the first aspect of the embodiments of the present disclosure, after sending, by an LPA, the profile request and before receiving, by the LPA, a profile request response, the method further includes receiving, by the LPA, a key negotiation request sent by the profile server, forwarding, by the LPA, the key negotiation request to the eUICC if the LPA determines, according to information carried in the key negotiation request, that a target receiver of the key negotiation request is the eUICC, receiving, by the LPA, a key negotiation response sent by the eUICC, and forwarding the key negotiation response to the profile server.

With reference to the first aspect of the embodiments of the present disclosure or the first or the second possible implementation of the first aspect, in a third possible implementation of the first aspect of the embodiments of the present disclosure, before generating, by an LPA, a profile request according to information about an eUICC of UE2, the method further includes obtaining, by the LPA, the information about the eUICC, or obtaining, by the LPA, the information about the eUICC, and displaying, by the LPA, the obtained information about the eUICC and operator information.

With reference to the third possible implementation of the first aspect of the embodiments of the present disclosure, in a fourth possible implementation of the first aspect of the embodiments of the present disclosure, before obtaining, by the LPA, the information about the eUICC, the method further includes establishing, by the LPA, a secure channel between the LPA and the eUICC, where the secure channel is used to obtain the information about the eUICC.

With reference to the first aspect of the embodiments of the present disclosure or the first, the second, or the third possible implementation of the first aspect, in a fifth possible implementation of the first aspect of the embodiments of the present disclosure, before receiving, by the LPA, a profile request response, the method further includes establishing, by the LPA, a secure channel between the LPA and the eUICC, where the secure channel is used to transmit the profile.

With reference to the fourth or the fifth possible implementation of the first aspect of the embodiments of the present disclosure, in a sixth possible implementation of the first aspect of the embodiments of the present disclosure, the method further includes if the LPA detects that the secure channel is disabled, re-establishing, by the LPA, a secure channel between the LPA and the eUICC.

With reference to any one of the fourth to the sixth possible implementations of the first aspect of the embodiments of the present disclosure, in a seventh possible implementation of the first aspect of the embodiments of the present disclosure, establishing, by the LPA, a secure channel between the LPA and the eUICC includes broadcasting, by the LPA, a service search request, establishing a local connection between the LPA and the UE2 or between the LPA and the eUICC, and establishing the secure channel between the LPA and the eUICC based on the local connection, receiving, by the LPA, a broadcast service search request, establishing a local connection between the LPA and the UE2 or between the LPA and the eUICC, and establishing the secure channel between the LPA and the eUICC based on the local connection, or receiving, by the LPA, a broadcast service search request carrying an eUICC service indicator, completing device discovery between the LPA and the eUICC according to the service indicator, establishing a local connection between the LPA and the UE2 or between the LPA and the eUICC, and establishing the secure channel between the LPA and the eUICC based on the local connection.

With reference to any one of the first aspect of the embodiments of the present disclosure, or the first to the seventh possible implementations of the first aspect, in an eighth possible implementation of the first aspect of the embodiments of the present disclosure, the information about the eUICC includes at least one of a device identity of the UE2 (UE2-ID), capability information of the UE2, a card identity of the eUICC (EID), or an eUICC information set (EIS) of the eUICC.

With reference to any one of the first aspect of the embodiments of the present disclosure, or the first to the eighth possible implementations of the first aspect, in a ninth possible implementation of the first aspect of the embodiments of the present disclosure, the profile request includes at least one of a device identity of the UE1 (UE1-ID), the UE2-ID, the capability information of the UE2, the EID, or the EIS of the eUICC.

With reference to the ninth possible implementation of the first aspect of the embodiments of the present disclosure, in a tenth possible implementation of the first aspect of the embodiments of the present disclosure, the profile matches the capability information of the UE2.

With reference to any one of the first aspect of the embodiments of the present disclosure, or the first to the tenth possible implementations of the first aspect, in an eleventh possible implementation of the first aspect of the embodiments of the present disclosure, forwarding, by the LPA, the profile to the eUICC includes extracting, by the LPA, the profile from the received profile request response, and forwarding the extracted profile to the eUICC, or forwarding, by the LPA to the eUICC, the profile request response carrying the profile.

With reference to any one of the first aspect of the embodiments of the present disclosure, or the first to the eleventh possible implementations of the first aspect, in a twelfth possible implementation of the first aspect of the embodiments of the present disclosure, after the forwarding, by the LPA, the profile to the eUICC, the method further includes sending, by the LPA to the eUICC, a profile activation request used to activate the profile, sending, by the LPA to the eUICC, a profile disabling request used to disable the profile, or sending, by the LPA to the eUICC, a profile delete request used to delete the profile.

With reference to any one of the first aspect of the embodiments of the present disclosure, or the first to the twelfth possible implementations of the first aspect, in a thirteenth possible implementation of the first aspect of the embodiments of the present disclosure, the generating, by an LPA, a profile request according to information about an eUICC of UE2 includes generating, by the LPA, the profile request according to the information about the eUICC if the LPA detects an operator network selection instruction, where an operator network provides a network service to the eUICC.

It can be learned that in the embodiments of the present disclosure, an LPA first generates a profile request according to information about an eUICC of a UE2, and sends the profile request to a profile server. Then, the LPA receives a profile request response sent by the profile server, where the profile request response includes a profile, encrypted by the profile server, of the eUICC. Finally, the LPA forwards the profile to the eUICC. The LPA belongs to a UE1, and the eUICC is disposed in the UE2. Therefore, it can be learned that by establishing a local connection between the LPA of the UE1 and the eUICC of the UE2, the LPA can conveniently and quickly manage the eUICC of the UE2, and directly download the profile for the eUICC of the UE2. This is conducive to profile processing efficiency enhancement of the eUICC and user experience improvement.

A second aspect of the embodiments of the present disclosure provides a profile processing profile method, including receiving, by an eUICC of a UE2, a key negotiation request forwarded by an LPA of a UE1, sending, by the eUICC, a key negotiation response to the LPA, and receiving, by the eUICC, a profile that is encrypted according to the key negotiation response and that is forwarded by the LPA.

In a first possible implementation of the second aspect of the embodiments of the present disclosure, before receiving, by an eUICC, a key negotiation request forwarded by an LPA, the method further includes sending, by the eUICC, information about the eUICC to the LPA.

With reference to the first possible implementation of the second aspect of the embodiments of the present disclosure, in a second possible implementation of the second aspect of the embodiments of the present disclosure, before sending, by the eUICC, information about the eUICC to the LPA, the method further includes establishing, by the eUICC, a secure channel between the LPA and the eUICC, where the secure channel is used to send the information about the eUICC.

With reference to the second aspect of the embodiments of the present disclosure or the first possible implementation of the second aspect of the embodiments of the present disclosure, in a third possible implementation of the second aspect of the embodiments of the present disclosure, before receiving, by the eUICC, a profile that is encrypted according to the key negotiation response and that is forwarded by the LPA, the method further includes establishing, by the eUICC, a secure channel between the LPA and the eUICC, where the secure channel is used to forward the profile.

With reference to the second or the third possible implementation of the second aspect of the embodiments of the present disclosure, in a fourth possible implementation of the second aspect of the embodiments of the present disclosure, after establishing, by the eUICC, a secure channel between the LPA and the eUICC, the method further includes disabling, by the eUICC, the secure channel if the eUICC detects that establishment duration of the secure channel is greater than or equal to a preset threshold.

With reference to the fourth possible implementation of the second aspect of the embodiments of the present disclosure, in a fifth possible implementation of the second aspect of the embodiments of the present disclosure, before receiving, by the eUICC, a profile that is encrypted according to the key negotiation response and that is forwarded by the LPA, the method further includes re-establishing, by the eUICC, the secure channel if the eUICC detects that the secure channel is disabled.

With reference to the second, the third, or the fifth possible implementation of the second aspect of the embodiments of the present disclosure, in a sixth possible implementation of the second aspect of the embodiments of the present disclosure, establishing, by the eUICC, the secure channel includes receiving, by the eUICC, a broadcast service search request, establishing a local connection between the eUICC and the UE1 or between the eUICC and the LPA, and establishing the secure channel between the LPA and the eUICC based on the local connection, broadcasting, by the eUICC, a service search request, establishing a local connection between the eUICC and the UE1 or between the eUICC and the LPA, and establishing the secure channel between the LPA and the eUICC based on the local connection, or broadcasting, by the eUICC, a service search request carrying an eUICC service indicator, establishing a local connection between the eUICC and the UE1 or between the eUICC and the LPA, and establishing the secure channel between the LPA and the eUICC based on the local connection, where the service indicator is used to complete device discovery between the LPA and the eUICC.

With reference to any one of the second aspect of the embodiments of the present disclosure, or the first to the sixth possible implementations of the second aspect of the embodiments of the present disclosure, in a seventh possible implementation of the second aspect of the embodiments of the present disclosure, the information about the eUICC includes at least one of a UE2-ID, capability information of the UE2, an EID, or an EIS of the eUICC.

With reference to the seventh possible implementation of the second aspect of the embodiments of the present disclosure, in an eighth possible implementation of the second aspect of the embodiments of the present disclosure, the profile matches the capability information of the UE2.

It can be learned that in the embodiments of the present disclosure, an eUICC of UE2 first receives a key negotiation request, the eUICC then sends a key negotiation response to an LPA, and finally, the eUICC receives a profile that is encrypted according to the key negotiation response and that is forwarded by the LPA. The LPA is disposed in a UE1. Therefore, the eUICC of the UE2 can establish a local connection between the LPA of the UE1 and the eUICC of the UE2, to further implement key negotiation between a profile server and the eUICC and download of the profile of the eUICC together with the LPA of the UE1. This is conducive to profile processing efficiency enhancement of the eUICC and user experience improvement.

A third aspect of the embodiments of the present disclosure provides a profile processing apparatus, disposed in a UE1, where the apparatus includes a generation unit configured to generate a profile request according to information about an eUICC of a UE2, a sending unit configured to send the profile request generated by the generation unit, and a receiving unit configured to receive a profile request response, where the profile request response includes at least a profile of the eUICC, where the sending unit is further configured to forward the profile to the eUICC.

In a first possible implementation of the third aspect of the embodiments of the present disclosure, a specific manner of sending, by the sending unit, the profile request generated by the generation unit includes sending, by the sending unit, the profile request generated by the generation unit to a profile server.

With reference to the first possible implementation of the third aspect of the embodiments of the present disclosure, in a second possible implementation of the third aspect of the embodiments of the present disclosure, the receiving unit is further configured to receive a key negotiation request sent by the profile server after the sending unit sends the profile request and before the receiving unit receives the profile request response, the sending unit is further configured to forward the key negotiation request to the eUICC when the profile processing apparatus determines, according to information carried in the key negotiation request, that a target receiver of the key negotiation request is the eUICC, the receiving unit is further configured to receive a key negotiation response sent by the eUICC, and the sending unit is further configured to forward the key negotiation response to the profile server.

With reference to the third aspect of the embodiments of the present disclosure or the first or the second possible implementation of the third aspect, in a third possible implementation of the third aspect of the embodiments of the present disclosure, the profile processing apparatus further includes an obtaining unit configured to obtain the information about the eUICC, or an obtaining unit configured to obtain the information about the eUICC, and a display unit configured to display the obtained information about the eUICC and operator information.

With reference to the third possible implementation of the third aspect of the embodiments of the present disclosure, in a fourth possible implementation of the third aspect of the embodiments of the present disclosure, the profile processing apparatus further includes a channel establishment unit configured to establish a secure channel between the profile processing apparatus and the eUICC before the obtaining unit obtains the information about the eUICC, where the secure channel is used to obtain the information about the eUICC.

With reference to the third aspect of the embodiments of the present disclosure or the first, the second, or the third possible implementation of the third aspect of the embodiments of the present disclosure, in a fifth possible implementation of the third aspect of the embodiments of the present disclosure, the channel establishment unit is further configured to establish a secure channel between the profile processing apparatus and the eUICC before the receiving unit receives the profile request response, where the secure channel is used to transmit the profile.

With reference to the fourth or the fifth possible implementation of the third aspect of the embodiments of the present disclosure, in a sixth possible implementation of the third aspect of the embodiments of the present disclosure, the channel establishment unit is further configured to re-establish a secure channel between the profile processing apparatus and the eUICC if the profile processing apparatus detects that the secure channel is disabled.

With reference to any one of the fourth to the sixth possible implementations of the third aspect of the embodiments of the present disclosure, in a seventh possible implementation of the third aspect of the embodiments of the present disclosure, the channel establishment unit is further configured to broadcast a service search request, establish a local connection between the LPA and the UE2 or between the LPA and the eUICC, and establish the secure channel between the profile processing apparatus and the eUICC based on the local connection, receive a broadcast service search request, establish a local connection between the LPA and the UE2 or between the LPA and the eUICC, and establish the secure channel between the profile processing apparatus and the eUICC based on the local connection, or receive a broadcast service search request carrying an eUICC service indicator, complete device discovery between the profile processing apparatus and the eUICC according to the service indicator, establish a local connection between the LPA and the UE2 or between the LPA and the eUICC, and establish the secure channel between the profile processing apparatus and the eUICC based on the local connection.

With reference to any one of the third aspect of the embodiments of the present disclosure, or the first to the seventh possible implementations of the third aspect of the embodiments of the present disclosure, in an eighth possible implementation of the third aspect of the embodiments of the present disclosure, the information about the eUICC includes at least one of a UE2-ID, capability information of the UE2, an EID, or an EIS of the eUICC.

With reference to any one of the third aspect of the embodiments of the present disclosure, or the first to the eighth possible implementations of the third aspect of the embodiments of the present disclosure, in a ninth possible implementation of the third aspect of the embodiments of the present disclosure, the profile request includes at least one of a UE1-ID, the UE2-ID, the capability information of the UE2, the EID, or the EIS of the eUICC.

With reference to the ninth possible implementation of the third aspect of the embodiments of the present disclosure, in a tenth possible implementation of the third aspect of the embodiments of the present disclosure, the profile matches the capability information of the UE2.

With reference to any one of the third aspect of the embodiments of the present disclosure, or the first to the tenth possible implementations of the third aspect of the embodiments of the present disclosure, in an eleventh possible implementation of the third aspect of the embodiments of the present disclosure, a specific manner of forwarding, by the sending unit, the profile to the eUICC includes extracting the profile from the received profile request response, and forwarding the extracted profile to the eUICC, or forwarding, to the eUICC, the profile request response carrying the profile.

With reference to any one of the third aspect of the embodiments of the present disclosure, or the first to the eleventh possible implementations of the third aspect of the embodiments of the present disclosure, in a twelfth possible implementation of the third aspect of the embodiments of the present disclosure, after forwarding the profile to the eUICC, the sending unit is further configured to send, to the eUICC, a profile activation request used to activate the profile, send, to the eUICC, a profile disabling request used to disable the profile, or send, to the eUICC, a profile delete request used to delete the profile.

With reference to any one of the third aspect of the embodiments of the present disclosure, or the first to the twelfth possible implementations of the third aspect of the embodiments of the present disclosure, in a thirteenth possible implementation of the third aspect of the embodiments of the present disclosure, the generation unit is further configured to generate the profile request according to the information about the eUICC when the profile processing apparatus detects an operator network selection instruction, where an operator network provides a network service to the eUICC.

It can be learned from above that in the embodiments of the present disclosure, a profile processing apparatus of a UE1 first generates a profile request according to information about an eUICC of a UE2, and sends the profile request. Then, the profile processing apparatus receives a profile request response, and the profile request response includes a profile, encrypted by a profile server, of the eUICC. Finally, the profile processing apparatus forwards the profile to the eUICC. The profile processing apparatus belongs to the UE1, and the eUICC is disposed in the UE2. Therefore, it can be learned that by establishing a local connection between the profile processing apparatus of the UE1 and the eUICC of the UE2, the profile processing apparatus can conveniently and quickly manage the eUICC of the UE2, and directly download the profile for the eUICC of the UE2. This is conducive to profile processing efficiency enhancement of the eUICC and user experience improvement.

A fourth aspect of the embodiments of the present disclosure provides an eUICC, disposed in a UE2, where the eUICC includes a receiving unit configured to receive a key negotiation request forwarded by an LPA of a UE1, and a sending unit configured to send a key negotiation response to the LPA, where the receiving unit is further configured to receive a profile that is encrypted according to the key negotiation response and that is forwarded by the LPA.

In a first possible implementation of the fourth aspect of the embodiments of the present disclosure, the sending unit is further configured to send information about the eUICC to the LPA before the receiving unit receives the key negotiation request forwarded by the LPA.

With reference to the first possible implementation of the fourth aspect of the embodiments of the present disclosure, in a second possible implementation of the fourth aspect of the embodiments of the present disclosure, the eUICC further includes a channel establishment unit configured to establish a secure channel between the LPA and the eUICC before the sending unit sends the information about the eUICC to the LPA, where the secure channel is used to send the information about the eUICC.

With reference to the fourth aspect of the embodiments of the present disclosure or the first possible implementation of the fourth aspect of the embodiments of the present disclosure, in a third possible implementation of the fourth aspect of the embodiments of the present disclosure, the channel establishment unit is further configured to establish a secure channel between the LPA and the eUICC before the receiving unit receives the profile that is encrypted according to the key negotiation response and that is forwarded by the LPA, where the secure channel is used to forward the profile.

With reference to the second or the third possible implementation of the fourth aspect of the embodiments of the present disclosure, in a fourth possible implementation of the fourth aspect of the embodiments of the present disclosure, the eUICC further includes a channel disabling unit configured to disable the secure channel after the channel establishment unit establishes the secure channel between the LPA and the eUICC if the eUICC detects that establishment duration of the secure channel is greater than or equal to a preset threshold.

With reference to the fourth possible implementation of the fourth aspect of the embodiments of the present disclosure, in a fifth possible implementation of the fourth aspect of the embodiments of the present disclosure, the channel establishment unit is further configured to re-establish the secure channel before the receiving unit receives the profile that is encrypted according to the key negotiation response and that is forwarded by the LPA and if the eUICC detects that the secure channel is disabled.

With reference to the second, the third, or the fifth possible implementation of the fourth aspect of the embodiments of the present disclosure, in a sixth possible implementation of the fourth aspect of the embodiments of the present disclosure, the channel establishment unit is further configured to receive a broadcast service search request, establish a local connection between the eUICC and the UE1 or between the eUICC and the LPA, and establish the secure channel between the LPA and the eUICC based on the local connection, broadcast a service search request, establish a local connection between the eUICC and the UE1 or between the eUICC and the LPA, and establish the secure channel between the LPA and the eUICC based on the local connection, or broadcast a service search request carrying an eUICC service indicator, establish a local connection between the eUICC and the UE1 or between the eUICC and the LPA, and establish the secure channel between the LPA and the eUICC based on the local connection, where the service indicator is used to complete device discovery between the LPA and the eUICC.

With reference to any one of the fourth aspect of the embodiments of the present disclosure, or the first to the sixth possible implementations of the fourth aspect of the embodiments of the present disclosure, in a seventh possible implementation of the fourth aspect of the embodiments of the present disclosure, the information about the eUICC includes at least one of a UE2-ID, capability information of the UE2, an EID, or an EIS of the eUICC.

With reference to the seventh possible implementation of the fourth aspect of the embodiments of the present disclosure, in an eighth possible implementation of the fourth aspect of the embodiments of the present disclosure, the profile matches the capability information of the UE2.

It can be learned from above that in the embodiments of the present disclosure, an eUICC of UE2 first receives a key negotiation request forwarded by an LPA of a UE1, the eUICC then sends a key negotiation response to the LPA, and finally, the eUICC receives a profile that is encrypted according to the key negotiation response and that is forwarded by the LPA. The LPA is disposed in the UE1. Therefore, the eUICC of the UE2 can implement key negotiation between a profile server and the eUICC and download of the profile of the eUICC using the LPA of the UE1. This is conducive to profile processing efficiency enhancement of the eUICC and user experience improvement.

A fifth aspect of the embodiments of the present disclosure provides a UE, including an LPA, where the UE includes a processor and a memory, where the LPA uses the processor to execute the steps of generating a profile request according to information about an eUICC of a UE2, sending the profile request, receiving a profile request response, where the profile request response includes at least a profile of the eUICC, and forwarding the profile to the eUICC.

In a first possible implementation of the embodiments of the present disclosure fifth aspect, when the LPA uses the processor to send the profile request, the processor is further configured to send the profile request to a profile server.

With reference to the first possible implementation of the fifth aspect of the embodiments of the present disclosure, in a second possible implementation of the fifth aspect of the embodiments of the present disclosure, after sending the profile request and before receiving the profile request response, the processor is configured to receive a key negotiation request sent by the profile server, forward the key negotiation request to the eUICC if determining, according to information carried in the key negotiation request, that a target receiver of the key negotiation request is the eUICC, and receive a key negotiation response sent by the eUICC, and forward the key negotiation response to the profile server.

With reference to the fifth aspect of the embodiments of the present disclosure or the first or the second possible implementation of the fifth aspect, in a third possible implementation of the fifth aspect of the embodiments of the present disclosure, before generating the profile request according to the information about the eUICC of the UE2, the processor is configured to obtain the information about the eUICC, or obtain the information about the eUICC, and display the obtained information about the eUICC and operator information.

With reference to the third possible implementation of the fifth aspect of the embodiments of the present disclosure, in a fourth possible implementation of the fifth aspect of the embodiments of the present disclosure, before obtaining the information about the eUICC, the processor is configured to establish a secure channel between the LPA and the eUICC, where the secure channel is used to obtain the information about the eUICC.

With reference to the third possible implementation of the fifth aspect of the embodiments of the present disclosure, in a fifth possible implementation of the fifth aspect of the embodiments of the present disclosure, before receiving the profile request response, the processor is configured to establish a secure channel between the LPA and the eUICC, where the secure channel is used to transmit the profile.

With reference to the fourth or the fifth possible implementation of the fifth aspect of the embodiments of the present disclosure, in a sixth possible implementation of the fifth aspect of the embodiments of the present disclosure, the processor is configured to re-establish a secure channel between the LPA and the eUICC when detecting that the secure channel is disabled.

With reference to the fourth or the sixth possible implementation of the fifth aspect of the embodiments of the present disclosure, in a seventh possible implementation of the fifth aspect of the embodiments of the present disclosure, when establishing the secure channel between the LPA and the eUICC, the processor is further configured to broadcast a service search request, establish a local connection between the LPA and the UE2 or between the LPA and the eUICC, and establish the secure channel between the LPA and the eUICC based on the local connection, receive a broadcast service search request, establish a local connection between the LPA and the UE2 or between the LPA and the eUICC, and establish the secure channel between the LPA and the eUICC based on the local connection, or receive a broadcast service search request carrying an eUICC service indicator, complete device discovery between the LPA and the eUICC according to the service indicator, establish a local connection between the LPA and the UE2 or between the LPA and the eUICC, and establish the secure channel between the LPA and the eUICC based on the local connection.

With reference to the fifth aspect of the embodiments of the present disclosure or the first or the seventh possible implementation of the fifth aspect of the embodiments of the present disclosure, in an eighth possible implementation of the fifth aspect of the embodiments of the present disclosure, the processor is configured to obtain the information about the eUICC, where the information about the eUICC includes at least one of a UE2-ID, capability information of the UE2, an EID, or an EIS of the eUICC.

With reference to any one of the fifth aspect of the embodiments of the present disclosure, or the first to the eighth possible implementations of the fifth aspect of the embodiments of the present disclosure, in a ninth possible implementation of the fifth aspect of the embodiments of the present disclosure, the processor is configured to send the profile request, where the profile request includes at least one of a UE1-ID, the UE2-ID, the capability information of the UE2, the EID, or the EIS of the eUICC.

With reference to the ninth possible implementation of the fifth aspect of the embodiments of the present disclosure, in a tenth possible implementation of the fifth aspect of the embodiments of the present disclosure, the profile matches the capability information of the UE2.

With reference to any one of the fifth aspect of the embodiments of the present disclosure, or the first to the tenth possible implementations of the fifth aspect of the embodiments of the present disclosure, in an eleventh possible implementation of the fifth aspect of the embodiments of the present disclosure, forwarding the profile to the eUICC includes extracting the profile from the received profile request response, and forwarding the extracted profile to the eUICC, or forwarding, to the eUICC, the profile request response carrying the profile.

With reference to any one of the fifth aspect of the embodiments of the present disclosure, or the first to the eleventh possible implementations of the fifth aspect of the embodiments of the present disclosure, in a twelfth possible implementation of the fifth aspect of the embodiments of the present disclosure, after forwarding the profile to the eUICC, the processor sends, to the eUICC, a profile activation request used to activate the profile, sends, to the eUICC, a profile disabling request used to disable the profile, or sends, to the eUICC, a profile delete request used to delete the profile.

With reference to any one of the fifth aspect of the embodiments of the present disclosure, or the first to the twelfth possible implementations of the fifth aspect of the embodiments of the present disclosure, in a thirteenth possible implementation of the fifth aspect of the embodiments of the present disclosure, generating a profile request according to information about an eUICC of UE2 includes generating the profile request according to the information about the eUICC if an operator network selection instruction is detected, where an operator network provides a network service to the eUICC.

It can be learned from above that in the embodiments of the present disclosure, an LPA first generates a profile request according to information about an eUICC of a UE2, and sends the profile request. Then, the LPA receives a profile request response, and the profile request response includes at least a profile of the eUICC. Finally, the LPA forwards the profile to the eUICC. The LPA belongs to a UE1, and the eUICC is disposed in the UE2. Therefore, it can be learned that the LPA can conveniently and quickly manage the eUICC of the UE2, and directly download the profile for the eUICC of the UE2. This is conducive to profile processing efficiency enhancement of the eUICC and user experience improvement.

A sixth aspect of the embodiments of the present disclosure provides an eUICC, disposed in a UE2, where the eUICC includes a processor and a memory, where the processor invokes code or an instruction in the memory to execute the steps of receiving a key negotiation request forwarded by an LPA of a UE1, sending a key negotiation response to the LPA, and receiving a profile that is encrypted according to the key negotiation response and that is forwarded by the LPA.

In a first possible implementation of the sixth aspect of the embodiments of the present disclosure, before receiving the key negotiation request forwarded by the LPA, the processor sends information about the eUICC to the LPA.

With reference to the first possible implementation of the sixth aspect of the embodiments of the present disclosure, in a second possible implementation of the sixth aspect of the embodiments of the present disclosure, before sending the information about the eUICC to the LPA, the processor establishes a secure channel between the LPA and the eUICC, where the secure channel is used to send the information about the eUICC.

With reference to the sixth aspect of the embodiments of the present disclosure or the first possible implementation of the sixth aspect of the embodiments of the present disclosure, in a third possible implementation of the sixth aspect of the embodiments of the present disclosure, before receiving the profile that is encrypted according to the key negotiation response and that is forwarded by the LPA, the processor establishes a secure channel between the LPA and the eUICC, where the secure channel is used to forward the profile.

With reference to the first or the second possible implementation of the sixth aspect of the embodiments of the present disclosure, in a fourth possible implementation of the sixth aspect of the embodiments of the present disclosure, after establishing the secure channel between the LPA and the eUICC, the processor disables the secure channel if detecting that establishment duration of the secure channel is greater than or equal to a preset threshold.

With reference to the fourth possible implementation of the sixth aspect of the embodiments of the present disclosure, in a fifth possible implementation of the sixth aspect of the embodiments of the present disclosure, before receiving the profile that is encrypted according to the key negotiation response and that is forwarded by the LPA and if detecting that the secure channel is disabled, the processor re-establishes the secure channel.

With reference to any one of the third to the fifth possible implementations of the sixth aspect of the embodiments of the present disclosure, in a sixth possible implementation of the sixth aspect of the embodiments of the present disclosure, establishing the secure channel includes receiving a broadcast service search request, establishing a local connection between the eUICC and the UE1 or between the eUICC and the LPA, and establishing the secure channel between the LPA and the eUICC based on the local connection, broadcasting a service search request, establishing a local connection between the eUICC and the UE1 or between the eUICC and the LPA, and establishing the secure channel between the LPA and the eUICC based on the local connection, or broadcasting a service search request carrying an eUICC service indicator, establishing a local connection between the eUICC and the UE1 or between the eUICC and the LPA, and establishing the secure channel between the LPA and the eUICC based on the local connection, where the service indicator is used to complete device discovery between the LPA and the eUICC.

With reference to any one of the sixth aspect of the embodiments of the present disclosure, or the first to the sixth possible implementations of the sixth aspect of the embodiments of the present disclosure, in a seventh possible implementation of the sixth aspect of the embodiments of the present disclosure, the information about the eUICC includes at least one of a UE2-ID, capability information of the UE2, an EID, or an EIS of the eUICC.

With reference to the seventh possible implementation of the sixth aspect of the embodiments of the present disclosure, in an eighth possible implementation of the sixth aspect of the embodiments of the present disclosure, the profile matches the capability information of the UE2.

It can be learned from above that in the embodiments of the present disclosure, an eUICC of UE2 first receives a key negotiation request forwarded by an LPA of a UE2, the eUICC then sends a key negotiation response to the LPA, and finally, the eUICC receives a profile forwarded by the LPA. The LPA is disposed in a UE1. Therefore, the eUICC of the UE2 can implement key negotiation between a profile server and the eUICC and download of the profile of the eUICC using the LPA of the UE1. This is conducive to profile processing efficiency enhancement of the eUICC and user experience improvement.

A seventh aspect of the embodiments of the present disclosure provides a profile processing system, including the UE according to the foregoing embodiments.

In the embodiments of the present disclosure, an LPA first generates a profile request according to information about an eUICC of a UE2, and sends the profile request to a profile server. Then, the LPA receives a profile request response sent by the profile server, and the profile request response includes a profile, encrypted by the profile server, of the eUICC. Finally, the LPA forwards the profile to the eUICC. The LPA belongs to a UE1, and the eUICC is disposed in the UE2. Therefore, it can be learned that by establishing a local connection between the LPA of the UE1 and the eUICC of the UE2, the LPA can conveniently and quickly manage the eUICC of the UE2, and directly download the profile for the eUICC of the UE2. This is conducive to profile processing efficiency enhancement of the eUICC and user experience improvement.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

The embodiments of the present disclosure provide a profile processing method, a profile processing apparatus, a UE, and an eUICC to enhance profile processing efficiency of an eUICC and improve user experience.

Figure 1:
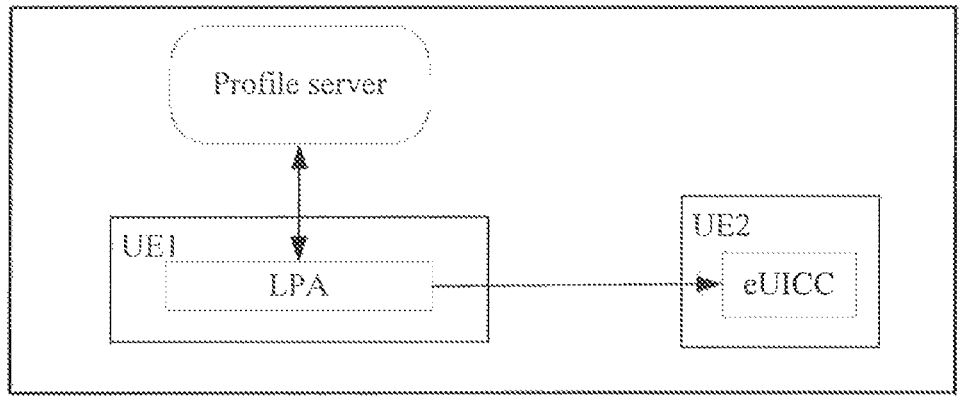
FIG. 1 is a schematic diagram of a network architecture of a profile processing system according to an embodiment of the present disclosure.

For ease of understanding the embodiments of the present disclosure, a network architecture in the embodiments of the present disclosure is first described below. Referring to FIG. 1, FIG. 1 is a schematic diagram of a network architecture according to an embodiment of the present disclosure. As shown in FIG. 1, the network architecture in this embodiment of the present disclosure may include a profile server, a UE1, a UE2, an LPA disposed in the UE1, and at least one eUICC disposed in the UE2. The eUICC may be welded onto the UE2 at delivery of the UE, or may be installed on the UE2 in a pluggable manner. The LPA is configured to discover SM-SR, download and manage a profile, and provide a UI (such as a management interface of an eUICC) to a user, for the user to manage a profile in the eUICC (such as profile activation, disabling, and deletion). The profile server may include, for example, at least one of an operator network server (i.e., Mobile Network Operator (MNO)), a subscription manager-data preparation (SM-DP) server, an SM-SR server, or a subscription manager-discovery service (SM-DS) server. The profile server may generate a profile that is required for the eUICC to access a corresponding operator network server, and send the profile to the eUICC to facilitate installation of the profile by the eUICC. The profile of the eUICC may be immediately generated when the profile is requested, or may be pre-stored. When a profile is requested, the profile server may allocate a pre-stored profile to the eUICC that performs requesting. The UE1 and the UE2 may include, for example, various types of electronic devices, such as a mobile phone, a tablet computer, a personal digital assistant (PDA), a television, an in-vehicle device, a machine-to-machine (M2M) device, a mobile Internet device (MID), and a smart wearable device (such as a smartwatch and a smart band). For example, a user may manage eUICCs in two terminals using the LPA. The two terminals may be multiple terminals of a same user, or two terminals of different users. When the two terminals do not belong to a same user, the LPA in the UE1 needs to obtain management rights of the UE2 to manage the eUICC of the UE2.

In the network architecture shown in FIG. 1, an LPA first generates a profile request according to information about an eUICC of a UE2, and sends the profile request to a profile server. Then, the LPA receives a profile request response sent by the profile server, and the profile request response includes a profile, encrypted by the profile server, of the eUICC. Finally, the LPA forwards the profile to the eUICC. The LPA belongs to a UE1, and the eUICC is disposed in the UE2. Therefore, it can be learned that by establishing a local connection between the LPA of the UE1 and the eUICC of the UE2, the LPA can conveniently and quickly manage the eUICC of the UE2, including direct download of the profile for the eUICC of the UE2. This is conducive to profile processing efficiency enhancement of the eUICC and user experience improvement.

Figure 2:
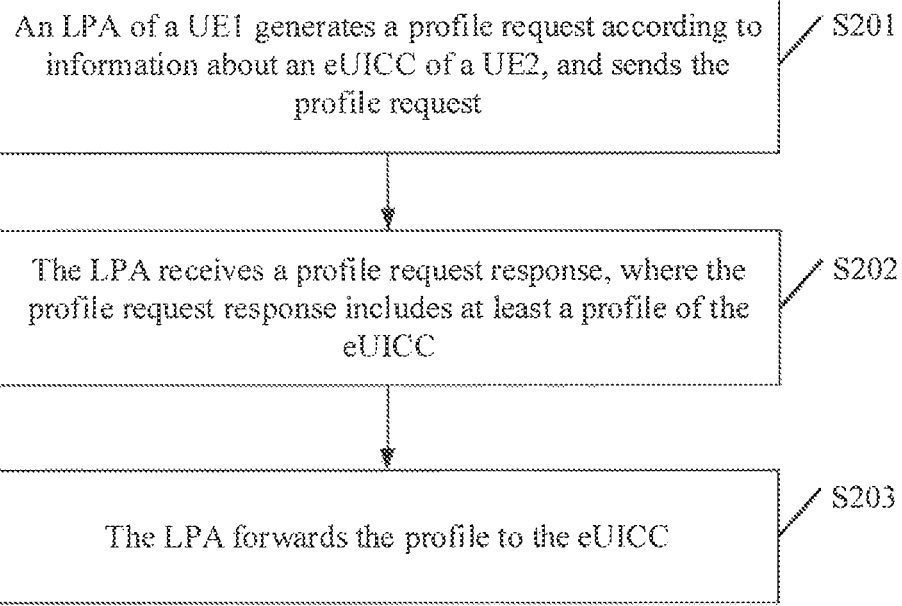
FIG. 2 is a flowchart of a profile processing method according to an embodiment of the present disclosure.

The foregoing describes the network architecture in the embodiments of the present disclosure. The following further describes a method according to the embodiments of the present disclosure. Referring to FIG. 2, FIG. 2 is a schematic flowchart of a profile processing method according to an embodiment of the present disclosure. The method described in FIG. 2 is described from a perspective of an LPA. As shown in FIG. 2, the method may include the following steps.

Step S201: An LPA of a UE1 generates a profile request according to information about an eUICC of a UE2, and sends the profile request.

In this embodiment of the present disclosure, the profile request includes at least one of a UE1-ID, capability information of the UE2, a UE2-ID, an EID of the eUICC (eUICC-ID) of the UE2, or an EIS of the eUICC. The information about the eUICC of the UE2 includes at least one of the capability information of the UE2, the UE2-ID, the EID of the eUICC, or the EIS of the eUICC.

For example, the LPA sends the profile request to a profile server. The profile server may include at least one of network side devices such as MNO, SM-DS, SM-DP, and SM-SR. Correspondingly, the profile request may be sent by the LPA to the MNO such that the MNO is triggered to generate a profile for or allocate a profile to the eUICC. Alternatively, the profile request may be sent by the LPA to the SM-DS to obtain an appropriate SM-SR address from the SM-DS such that the LPA downloads a profile from the SM-SR and SM-DP corresponding to the SM-SR. The profile request may also be sent by the LPA to the SM-SR such that the SM-SR searches for appropriate SM-DP to download a profile. The profile request may also be sent to the SM-DP to download a profile, and no limitation is set herein.

The profile request generated by the LPA may further include at least one of the following information, the UE2-ID, the EID of the eUICC of the UE2, the EIS of the eUICC, or the capability information of the UE2. The profile server can identify, according to the information, that a target file configuration terminal of the profile request is the UE2 instead of the UE1 sending the profile request. In this way, the profile server further generates or allocates, according to the capability information of the UE2, a profile matching the capability information.

The profile request sent by the LPA to the profile server is to be transferred using a secure session connection established between the LPA and the profile server, for example, using a Hypertext Transfer Protocol Secure (HTTPS) connection established between the LPA and the profile server.

A specific implementation of generating, by the LPA, the profile request according to the information about the eUICC of the UE2 may include generating, by the LPA, the profile request according to the information about the eUICC if the LPA detects an operator network selection instruction, where an operator network provides a network service to the eUICC.

For example, a user may select an operator for the eUICC of the UE2 using an eUICC management interface provided by the LPA (further, the eUICC management interface may be displayed on a display screen of the UE1). The eUICC management interface provided by the LPA may further include information such as a list of available operators, a charging list, and to-be-configured information about the eUICC. The LPA may refresh information about the list of available operators that can be selected by the user according to location information of the user.

Step S202: The LPA receives a profile request response, where the profile request response includes at least a profile of the eUICC.

In this embodiment of the present disclosure, after receiving the profile request, the profile server can identify, according to associated information (such as the device identity, a user identity, an EID, and an EIS) of the UE1 to which the LPA belongs and associated information (such as the device identity, a user identity, the EID, and the EIS) of the UE2 to which the eUICC belongs that are in the profile request, that a target receiver of the profile request is the eUICC of the UE2, and further generate or allocate, according to the capability information of the UE2, EID information of the UE2, or EIS information of the UE2, a profile matching the capability information of the UE2. The profile of the eUICC may be immediately generated when the eUICC requests the profile, or may be pre-stored. When the eUICC requests a profile, a pre-stored profile is allocated to the eUICC that performs requesting.

For example, the UE1 is a smartphone of a user, the UE2 is a smartwatch of the user, an LPA is disposed in the smartphone, and at least one eUICC is disposed in the smartwatch. The LPA in the smartphone can send, for example, to a Unicom network server, a profile request carrying at least one of the following information, capability information (such as a memory capacity and a central processing unit (CPU) clock speed) of the smartwatch, a device identity of the smartwatch, an EID of the eUICC of the smartwatch, an EIS of the eUICC of the smartwatch, or a device identity of the smartphone. After receiving the profile request, the Unicom network server first identifies that a device to which the eUICC belongs is not the smartphone to which the LPA belongs, extracts the capability information of the smartwatch, EID information of the smartwatch, or EIS information of the smartwatch, and generates a profile matching the capability information of the smartwatch (the profile may include a third party application program that can be hosted on the smartwatch).

Further, for example, the profile server includes at least one of network devices such as MNO, SM-DS, SM-DP, and SM-SR. The profile request may be directly sent to the MNO, and the MNO sends, according to the profile request, a profile request response to corresponding SM-DP in order to generate a matching profile for or allocate a matching profile to the eUICC. The SM-DP sends the profile request response to corresponding SM-SR, and the SM-SR further sends the profile request response to the LPA of the UE1. The profile request response includes a create message of an issuer security domain-profile (ISD-P), a profile download message, or a profile data send message. For example, the MNO sends a profile download message to the SM-DP, the SM-DP sends one ISD-P create message to the SM-SR, and after the LPA forwards the ISD-P create message to the eUICC, the SM-DP sends a profile data send message to the SM-SR, and the LPA forwards the profile data send message to the eUICC. These cases are all within the protection scope. The profile request response includes at least the profile of the eUICC.

Step S203: The LPA forwards the profile to the eUICC.

In this embodiment of the present disclosure, a specific implementation of forwarding, by the LPA, the profile to the eUICC includes extracting, by the LPA, the profile from the received profile request response, and forwarding the extracted profile to the eUICC, or forwarding, by the LPA to the eUICC, the profile request response carrying the profile.

After receiving the profile request response, the LPA learns, by means of parsing, that the target receiver of the profile is the eUICC of the UE2. For example, the LPA may determine, according to an EID carried in the profile request response, that the target receiver of the profile is the eUICC of the UE2.

Further, after forwarding the profile to the eUICC, the LPA may further manage the profile of the eUICC, including sending, by the LPA to the eUICC, a profile activation request used to activate the profile, sending, by the LPA to the eUICC, a profile disabling request used to disable the profile, sending, by the LPA to the eUICC, a profile delete request used to delete the profile, or sending, by the LPA to the eUICC, a profile migration request used to migrate the profile. The management operation on the eUICC may be implemented using a UI provided by the LPA to trigger operations such as activating a profile, disabling a profile, deleting a profile, and migrating a profile.

It can be learned that in this embodiment of the present disclosure, an LPA first generates a profile request according to information about an eUICC of a UE2, and sends the profile request. Then, the LPA receives a sent profile request response, and the profile request response includes at least a profile of the eUICC. Finally, the LPA forwards the profile to the eUICC. The LPA belongs to a UE1, and the eUICC is disposed in the UE2. Therefore, a local connection is established between the LPA of the UE1 and the eUICC of the UE2 such that the LPA of the UE1 conveniently and quickly manages the eUICC of the UE2, and the LPA of the UE1 can directly download the profile for the eUICC of the UE2. This is conducive to profile processing efficiency enhancement of the eUICC and user experience improvement.

Optionally, in this embodiment of the present disclosure, after the LPA sends the profile request and before the LPA receives the profile request response, the LPA may further execute the following operations to implement key negotiation between the eUICC and the profile server, receiving, by the LPA, a key negotiation request sent by the profile server, forwarding, by the LPA, the key negotiation request to the eUICC if the LPA determines, according to information carried in the key negotiation request, that a target receiver of the key negotiation request is the eUICC, receiving, by the LPA, a key negotiation response sent by the eUICC, and forwarding the key negotiation response to the profile server.

The key negotiation request sent by the profile server and received by the LPA may carry the EID of the eUICC of the UE2. In this way, the LPA does not parse the key negotiation request, but forwards the key negotiation request to the eUICC of the UE2 according to the EID, and receives the key negotiation response returned by the eUICC and forwards the key negotiation response to the profile server in order to implement end-to-end key negotiation between the profile server and the eUICC of the UE2.

Optionally, before receiving the key negotiation request sent by the profile server, the LPA determines whether there is a secure channel between the LPA and the eUICC, for example, whether a secure channel is established, or whether an established secure channel is disabled. If there is no secure channel or the established secure channel is disabled, the LPA establishes a secure channel between the LPA and the eUICC to ensure communication between the LPA and the eUICC.

Optionally, in this embodiment of the present disclosure, before the LPA generates the profile request according to the information about the eUICC of UE2, the LPA may further obtain the information about the eUICC.

It can be understood that there may be various implementations of obtaining the information about the eUICC by the LPA.

In an embodiment, the LPA may obtain the information about the eUICC using a short-range communications technology.

In another embodiment, the LPA may also obtain the information about the eUICC in a manner such as scanning a two-dimensional barcode, radio frequency identification (RFID), or using an near field communication (NFC) tag.

In still another embodiment, the LPA may further display, on the UE1, an eUICC management interface including the obtained information about the eUICC and operator information. The operator information includes at least the operator network selected by a user. In this way, the information about the eUICC of the UE2 can be visually displayed using the eUICC management interface of the UE1. This is convenient for the user to manage the eUICC of the UE2 (such as downloading a profile, selecting a profile server, activating a profile, disabling a profile, and deleting a profile). As a result, this helps the user to more conveniently and quickly manage the eUICC of the UE2, and improve user experience. Optionally, before any communication between the LPA and the eUICC, the LPA needs to determine whether there is a secure channel between the LPA and the eUICC.

For example, before the LPA obtains the information about the eUICC, the LPA establishes a secure channel between the LPA and the eUICC. The secure channel is used to obtain the information about the eUICC. Before the LPA receives the profile request response, the LPA may further establish a secure channel between the LPA and the eUICC. The secure channel is used to transmit the profile.

For example, the LPA may establish a secure channel with the eUICC first, transmit the information about the eUICC over the secure channel, and further transfer the profile over the secure channel.

Alternatively, the LPA may further obtain the information about the eUICC in a manner of scanning a two-dimensional barcode, then establish a secure channel, and transfer the profile over the secure channel.

Optionally, if there is no secure channel or the established secure channel is disabled, the LPA re-establishes a secure channel between the LPA and the eUICC in order to ensure communication between the LPA and the eUICC.

In specific implementation, specific implementations of establishing, by the LPA, the secure channel may include several implementations, broadcasting, by the LPA, a service search request, establishing a local connection between the LPA and the UE2 or between the LPA and the eUICC, and establishing the secure channel between the LPA and the eUICC based on the local connection, receiving, by the LPA, a broadcast service search request, establishing a local connection between the LPA and the UE2 or between the LPA and the eUICC, and establishing the secure channel between the LPA and the eUICC based on the local connection, or receiving, by the LPA, a broadcast service search request carrying an eUICC service indicator, completing device discovery between the LPA and the eUICC according to the service indicator, establishing a local connection between the LPA and the UE2 or between the LPA and the eUICC, and establishing the secure channel between the LPA and the eUICC based on the local connection.

The eUICC service indicator is used to notify the LPA that the service search request is a service search request used to perform eUICC profile management such that the LPA in a device supporting eUICC profile management establishes a secure channel with the eUICC sending the service search request.

In addition, the local connection, for example, may be implemented using a short-range communications technology such as a short-range communications technology, a BLUETOOTH technology, an NFC technology, a WI-FI technology, or a wireless local area network (WLAN) direct connection technology, and no limitation is set herein.

For example, the UE1 enables an underlying BLUETOOTH communication module, and sends the broadcast service search request, the UE2 also enables a BLUETOOTH communication module, and after receiving the service search request, the BLUETOOTH module of the UE2 responds to the service search request. In this way, a BLUETOOTH-based local connection is established between the UE1 and the UE2, and a secure channel is established between the LPA of the UE1 and the eUICC of the UE2 based on the local connection. The establishment of the BLUETOOTH connection may be initiated by the LPA or the BLUETOOTH module of the UE1, and may be responded by the BLUETOOTH module of the UE2 or the eUICC, and no limitation is set herein. For the secure channel, after the local connection is established, the eUICC may use the established local connection to proactively initiate the establishment of the secure channel to the LPA, or the LPA may use the established local connection to proactively initiate the establishment of the secure channel to the eUICC.

For example, the secure channel described above may be a secure channel such as a Bearer Independent Protocol (BIP) channel or SCP 01, SCP02, SCP 03, SCP 10, SCP 80, or SCP 81 defined in the Secure Channel Protocol (SCP). The secure channel may be a secure channel established between the profile server and the eUICC using the LPA as a relay. The secure channel may be implemented using a manage channel message manage channel message and an open channel message open channel message.

Figure 3:
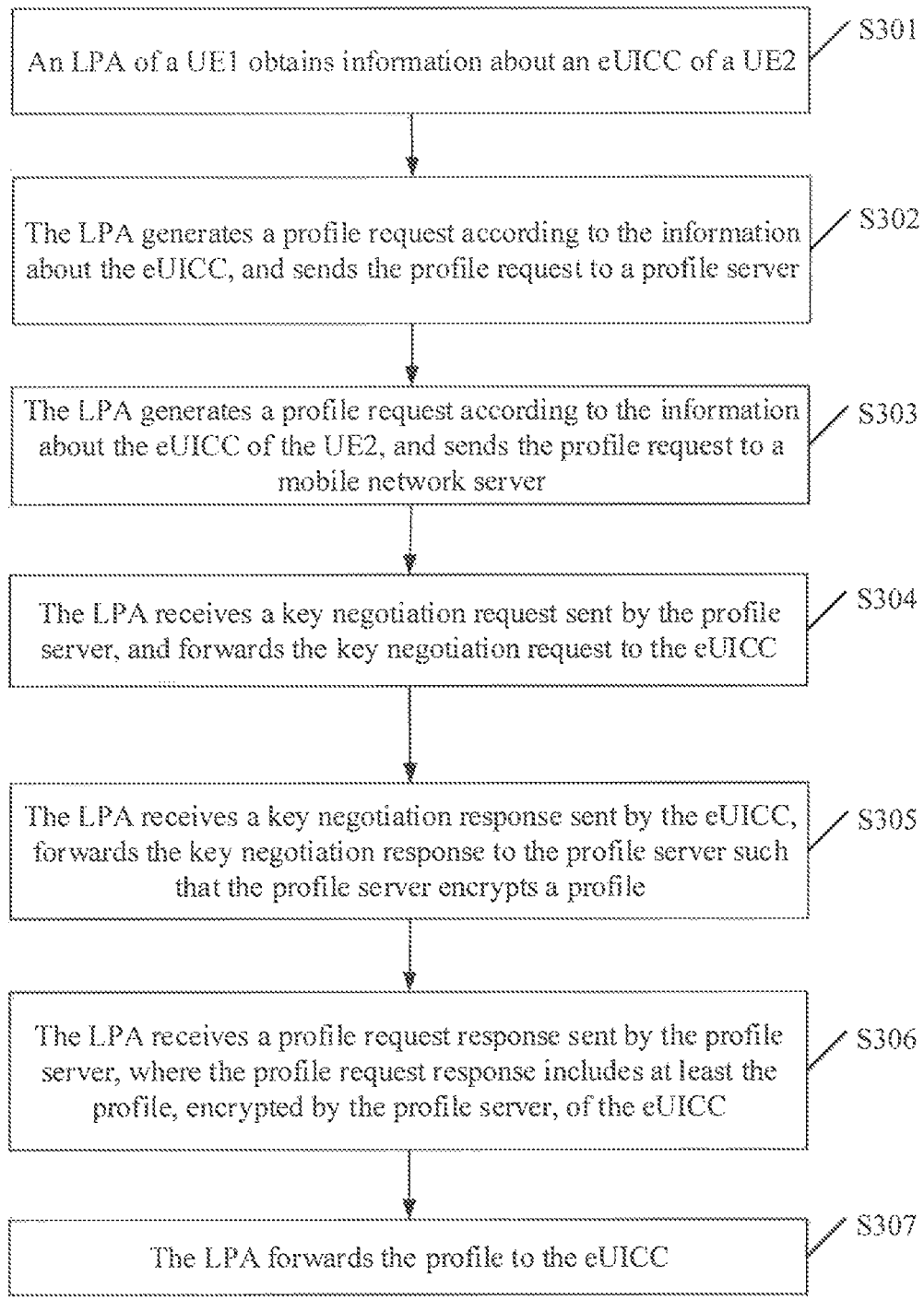
FIG. 3 is a flowchart of a profile processing method according to another embodiment of the present disclosure.

Referring to FIG. 3, FIG. 3 is a schematic flowchart of a profile processing method according to another embodiment of the present disclosure. The profile processing method shown in FIG. 3 is described from a perspective of an LPA. As shown in FIG. 3, the profile processing method according to the other embodiment of the present disclosure may include the following steps.

Step S301: An LPA of a UE1 obtains information about an eUICC of a UE2.

In this embodiment of the present disclosure, the information about the eUICC of the UE2 includes at least one of capability information of the UE2, a UE2-ID, an EID of the eUICC of the UE2, or an EIS of the eUICC.

Optionally, The LPA of the UE1 obtains the information about the eUICC of the UE2, and the LPA displays the obtained information about the eUICC and operator information.

In this embodiment of the present disclosure, the LPA may obtain the information about the eUICC using a short-range communications technology, or may obtain the information about the eUICC in a manner such as scanning a two-dimensional barcode.

The LPA may also obtain the information about the eUICC by establishing a secure channel between the LPA and the eUICC of the UE2.

A specific implementation of establishing, by the LPA, the secure channel between the LPA and the eUICC of the UE2 is the same as that in the embodiment shown in FIG. 2, and details are not described herein again.

Step S302: The LPA generates a profile request according to the information about the eUICC, and sends the profile request to a profile server.

Optionally, in step S303 the LPA generates a profile request according to the information about the eUICC of the UE2, and sends the profile request to a mobile network server.

In this embodiment of the present disclosure, the profile request includes at least one of a UE1-ID, the capability information of the UE2, the UE2-ID, the EID of the eUICC of the UE2, or the EIS of the eUICC.

Step S304: The LPA receives a key negotiation request sent by the profile server, and forwards the key negotiation request to the eUICC, where the key negotiation request sent by the profile server and received by the LPA may carry an EID of the eUICC of the UE2 such that the LPA does not parse the key negotiation request, but forwards the key negotiation request to the eUICC of the UE2 according to the EID, and receives a key negotiation response returned by the eUICC and forwards the key negotiation response to the profile server in order to implement end-to-end key negotiation between the profile server and the eUICC of the UE2.

Optionally, before receiving the key negotiation request sent by the profile server, the LPA detects whether a secure channel is established between the LPA and the eUICC, or whether the established secure channel is disabled. If there is no secure channel or the established secure channel is disabled, the LPA establishes the secure channel to transfer the key negotiation request over the secure channel.

Optionally, the EID of the eUICC may be carried in the key negotiation request and a secure channel establishment request such that the LPA forwards the request to the eUICC of the UE2 according to EID information.

Step S305: The LPA receives the key negotiation response sent by the eUICC, forwards the key negotiation response to the profile server such that the profile server encrypts the profile.

Step S306: The LPA receives a profile request response sent by the profile server, where the profile request response includes at least the profile, encrypted by the profile server, of the eUICC.

Step S307: The LPA forwards the profile to the eUICC.

Optionally, the LPA forwards the profile to the eUICC of the UE2 according to EID information carried in a profile request response sent by a mobile network server. Optionally, after forwarding the profile to the eUICC of the UE2, the LPA may update information about the profile of the eUICC to a UI of the LPA such that a user can view the information about the profile, and can further implement operations, such as activating, disabling, and deleting the profile, using the UI. For example, the UI of the LPA displays at least one of the following information, an identity of the eUICC, corresponding operator information, package service information, profile status information, and EIS information.

In this embodiment of the present disclosure, a specific implementation of forwarding, by the LPA, the profile to the eUICC may include extracting, by the LPA, the profile from the received profile request response, and forwarding the profile to the eUICC, or forwarding, by the LPA to the eUICC, the profile request response carrying the profile.

Further, after forwarding the profile to the eUICC, the LPA may further manage the profile of the eUICC, including sending, by the LPA to the eUICC, a profile activation request used to activate the profile, sending, by the LPA to the eUICC, a profile disabling request used to disable the profile, sending, by the LPA to the eUICC, a profile delete request used to delete the profile, or sending, by the LPA to the eUICC, a profile migration request used to migrate the profile. The management operation on the eUICC may be implemented using a UI provided by the LPA to trigger operations such as activating a profile, disabling a profile, deleting a profile, and migrating a profile.

It can be learned that in this embodiment of the present disclosure, an LPA first generates a profile request according to information about an eUICC of a UE2, and sends the profile request to a profile server. Then, the LPA receives a profile request response sent by the profile server, and the profile request response includes a profile, encrypted by the profile server, of the eUICC. Finally, the LPA forwards the profile to the eUICC. The LPA belongs to a UE1, and the eUICC is disposed in the UE2. Therefore, it can be learned that by establishing a local connection between the LPA of the UE1 and the eUICC of the UE2, the LPA can conveniently and quickly manage the eUICC of the UE2, and directly download the profile for the eUICC of the UE2. This is conducive to profile processing efficiency enhancement of the eUICC and user experience improvement.

In addition, after downloading the profile for the eUICC of the UE2, the LPA can further flexibly manage the profile of the eUICC of the UE2, including convenient and quick management operations such as activating the profile, disabling the profile, and deleting the profile for the eUICC of the UE2. This is conducive to profile processing efficiency enhancement of the eUICC and user experience improvement.

Optionally, in this embodiment of the present disclosure, after the LPA receives the profile request response sent by the profile server and before the LPA forwards the profile to the eUICC, the LPA detects whether there is a secure channel, or whether an established secure channel is disabled. If there is no secure channel or the established secure channel is disabled, the LPA establishes the secure channel.

Figure 4:
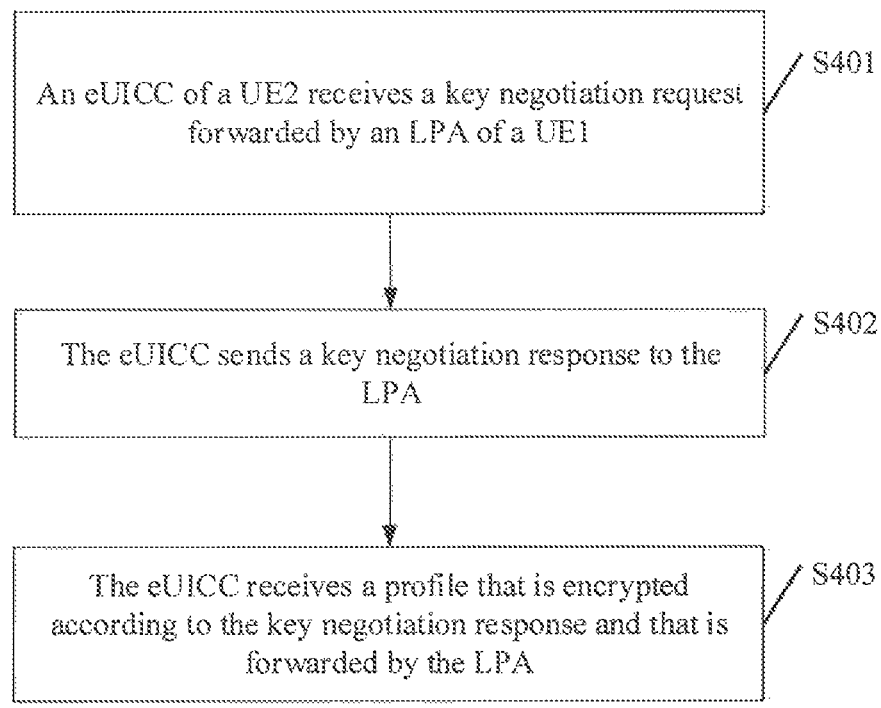
FIG. 4 is a flowchart of a profile processing method according to still another embodiment of the present disclosure.

Referring to FIG. 4, FIG. 4 is a schematic flowchart of a profile processing method according to still another embodiment of the present disclosure. The method described in FIG. 4 is described from a perspective of an eUICC of UE2. As shown in FIG. 4, the method may include the following steps.

Step S401: An eUICC of a UE2 receives a key negotiation request forwarded by an LPA of a UE1.

In this embodiment of the present disclosure, forwarding means a process in which a profile server sends the key negotiation request to the LPA and the LPA sends the key negotiation request to the eUICC.

Further, after receiving the profile request sent by the LPA, the profile server obtains a profile of the eUICC, and sends the key negotiation request that is generated based on the profile to the LPA. The profile request is generated by the LPA according to information about the eUICC, and is a request used to request configuration of the eUICC. When determining, according to information carried in the key negotiation request, that a target receiver of the key negotiation request is the eUICC, the LPA of the UE1 forwards the key negotiation request to the eUICC.

Step S402: The eUICC sends a key negotiation response to the LPA.

In this embodiment of the present disclosure, the eUICC sends the key negotiation response to the LPA such that the LPA forwards the key negotiation response to the profile server. In this way, after receiving the key negotiation response, the profile server encrypts the profile.

Step S403: The eUICC receives a profile that is encrypted according to the key negotiation response and that is forwarded by the LPA.

It can be learned that in this embodiment of the present disclosure, an eUICC of UE2 first receives a key negotiation request, the eUICC then sends a key negotiation response to an LPA, and finally, the eUICC receives a profile that is encrypted according to the key negotiation response and that is forwarded by the LPA. The LPA is disposed in a UE1. Therefore, the eUICC of the UE2 can establish a local connection between the LPA of the UE1 and the eUICC of the UE2, to further implement key negotiation between a profile server and the eUICC and download of the profile of the eUICC together with the LPA of the UE1. This is conducive to profile processing efficiency enhancement of the eUICC and user experience improvement.

Optionally, in this embodiment of the present disclosure, before the eUICC of the UE2 receives the key negotiation request forwarded by the LPA of the UE1, the eUICC may send information about the eUICC to the LPA.

It can be understood that there may be various implementations of sending, by the eUICC, the information about the eUICC to the LPA.

For example, the eUICC may send the information about the eUICC to the LPA using a secure channel between the LPA and the eUICC of the UE2.

For another example, the eUICC may also obtain the information about the eUICC using a short-range communication technology, RFID, or an NFC tag, or by means of scanning a two-dimensional barcode.

Optionally, the information about the eUICC includes at least one of capability information of the UE2, a UE2-ID, an EID of the eUICC, or an EIS of the eUICC.

Optionally, in this embodiment of the present disclosure, before the eUICC sends the information about the eUICC to the LPA, the eUICC may establish a secure channel between the LPA and the eUICC, where the secure channel is used to send the information about the eUICC.

Optionally, in this embodiment of the present disclosure, before the eUICC receives the profile that is encrypted according to the key negotiation response and that is forwarded by the LPA, the eUICC may establish a secure channel between the LPA and the eUICC, where the secure channel is used to forward the profile.

Optionally, in this embodiment of the present disclosure, after the eUICC establishes the secure channel, if the eUICC detects that establishment duration of the secure channel is greater than or equal to a preset threshold, the eUICC may disable the secure channel.

Optionally, in this embodiment of the present disclosure, before the eUICC receives the profile in a profile request response sent by the profile server and forwarded by the LPA, the eUICC detects whether the secure channel is established, or whether an established secure channel is disabled. If there is no secure channel or the established secure channel is disabled, the eUICC re-establishes the secure channel.

Optionally, in this embodiment of the present disclosure, a specific implementation of establishing, by the eUICC, the secure channel between the LPA and the eUICC may include receiving, by the eUICC, a broadcast service search request, establishing a local connection between the eUICC and the UE1 or between the eUICC and the LPA, and establishing the secure channel between the LPA and the eUICC based on the local connection, broadcasting, by the eUICC, a service search request, establishing a local connection between the eUICC and the UE1 or between the eUICC and the LPA, and establishing the secure channel between the LPA and the eUICC based on the local connection, or broadcasting, by the eUICC, a service search request carrying an eUICC service indicator, establishing a local connection between the eUICC and the UE1 or between the eUICC and the LPA, and establishing the secure channel between the LPA and the eUICC based on the local connection, where the service indicator is used to complete device discovery between the LPA and the eUICC.

The eUICC service indicator is used to indicate, to the LPA, that the service search request is a service search request used to perform eUICC profile management such that the LPA in a device supporting eUICC profile management establishes a secure channel with the eUICC sending the service search request.

In this embodiment of the present disclosure, the eUICC may establish the secure channel using a local connection, for example, using a short-range communications technology such as a short-range communications technology, a BLUETOOTH technology, an NFC technology, a WI-FI technology, or a WLAN direct connection technology, and no limitation is set herein. For example, the UE2 enables an underlying BLUETOOTH communication module, and sends the broadcast service search request. The UE1 also enables a BLUETOOTH communication module, and after receiving the service search request, the BLUETOOTH module of the UE1 responds to the service search request. In this way, a BLUETOOTH-based local connection is established between the UE2 and the UE1, and a secure channel is established between the LPA of the UE1 and the eUICC of the UE2 based on the local connection. The establishment of the BLUETOOTH connection may be initiated by the eUICC or the BLUETOOTH module of the UE2, and may be responded by the BLUETOOTH module of the UE1 or the LPA, and no limitation is set herein. For the secure channel, after the local connection is established, the eUICC may use the established local connection to proactively initiate the establishment of the secure channel to the LPA, or the LPA may use the established local connection to proactively initiate the establishment of the secure channel to the eUICC.

Figure 5:
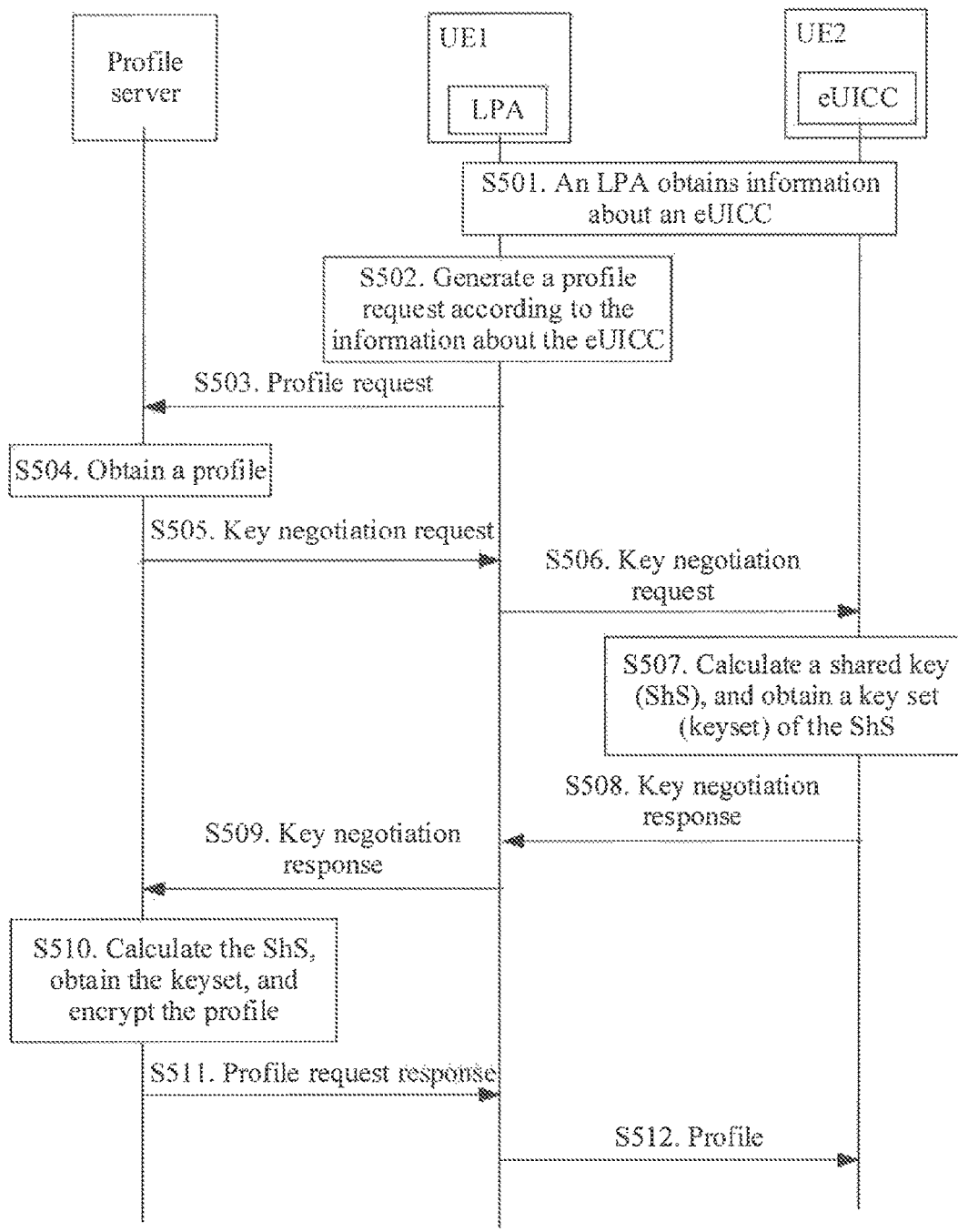
FIG. 5 is a flowchart of a profile processing method according to still another embodiment of the present disclosure.

To more clearly describe the embodiments of the present disclosure, a profile processing method according to an embodiment of the present disclosure is described with reference to the network architecture shown in FIG. 1. Referring to FIG. 5, FIG. 5 is a schematic flowchart of yet another profile processing method according to an embodiment of the present disclosure. The method described in FIG. 5 is described from perspectives of an LPA, an eUICC, and a profile server. As shown in FIG. 5, the method may include the following steps.

Step S501: An LPA of a UE1 obtains information about an eUICC of a UE2.

Optionally, the LPA may obtain the information about the eUICC using a secure channel between the LPA and the eUICC, or the eUICC may obtain the information about the eUICC using a short-range communication technology, RFID, or an NFC tag, or by means of scanning a two-dimensional barcode.

Optionally, before the LPA obtains the information about the eUICC using a secure channel between the LPA and the eUICC, the LPA may further establish the secure channel between the LPA and the eUICC of the UE2. The LPA belongs to the UE1. Establishment of the secure channel may be initiated by the LPA or by the eUICC.

In this embodiment of the present disclosure, the secure channel may be established using a local connection, for example, using a short-range communications technology such as a short-range communications technology, a BLUETOOTH technology, an NFC technology, a WI-FI technology, or a WLAN direct connection technology, and no limitation is set herein. For example, the UE1 enables an underlying BLUETOOTH communication module, and sends a broadcast service search request, the UE2 also enables a BLUETOOTH communication module, and after receiving the service search request, the BLUETOOTH module of the UE2 responds to the service search request. In this way, a BLUETOOTH-based local connection is established between the UE1 and the UE2, and a secure channel is established between the LPA of the UE1 and the eUICC of the UE2 based on the local connection. The establishment of the BLUETOOTH connection may be initiated by the LPA or the BLUETOOTH module of the UE1, and may be responded by the BLUETOOTH module of the UE2 or the eUICC, and no limitation is set herein. The establishment of the BLUETOOTH connection may be initiated by the eUICC or the BLUETOOTH module of the UE2, and may be responded by the BLUETOOTH module of the UE1 or the LPA, and no limitation is set herein. For the secure channel, after the local connection is established, the eUICC may use the established local connection to proactively initiate the establishment of the secure channel to the LPA, or the LPA may use the established local connection to proactively initiate the establishment of the secure channel to the eUICC.

The information about the eUICC of the UE2 includes at least one of capability information of the UE2, a UE2-ID, an EID of the eUICC, or an EIS of the eUICC.

For example, the LPA generates at least one of the following information, the UE2-ID, the EID of the eUICC of the UE2, the EIS of the eUICC of the UE2, or the capability information of the UE2, and the information is carried in a profile request. The information is used by a profile server to identify that the profile request is used to request to generate a profile for or allocate a profile to the second terminal of a user instead of the terminal UE1 sending the profile request such that the profile server can generate or allocate a suitable file configuration for or to the UE2 or the eUICC of the UE2.

Step S502: The LPA generates a profile request according to the information about the eUICC of the UE2.

The profile request includes at least one of a UE1-ID, the capability information of the UE2, the UE2-ID, the EID of the eUICC (eUICC-ID) of the UE2, or the EIS of the eUICC.

A specific implementation of generating, by the LPA, the profile request according to the information about the eUICC of the UE2 may include generating, by the LPA, the profile request according to the information about the eUICC of the UE2 when the LPA detects a select operation instruction, where the select operation instruction is made by the user to select an operator network corresponding to the profile serve, and the operator network is a network used to provide a network service to the eUICC and selected by the user. For example, the user may use a UI provided by the LPA to select one operator for the eUICC of the UE2. The UI provided by the LPA may further provide information such as a list of available operators, a charging list, and to-be-configured information about the eUICC. The LPA may refresh information about the list of available operators that can be selected by the user according to location information of the user. Alternatively, a corresponding profile server may be directly selected according to EID or EIS information of the eUICC. For example, initial MNO, SM-DP, SM-SR, or SM-DS information has been preset in the EID and the EIS of the eUICC.

Step S503: The LPA sends the profile request to a profile server.

For example, the profile server may include at least one of network devices such as MNO, SM-DS, SM-DP, and SM-SR. Therefore, the profile request may be directly sent to the MNO such that the MNO is triggered to generate a profile for or allocate a profile to the eUICC. Alternatively, the profile request may be sent to the SM-DS to obtain an appropriate SM-SR address from the SM-DS such that the LPA downloads a profile from the SM-SR and SM-DP corresponding to the SM-SR. The profile request may also be sent to the SM-SR such that the SM-SR searches for appropriate SM-DP to download a profile. The profile request may also be sent to the SM-DP to download a profile, and no limitation is set herein.

The profile request sent by the LPA to the profile server is to be transferred using a secure session connection established between the LPA and the profile server, for example, using an HTTPS connection established between the LPA and the profile server.

Step S504: The profile server obtains a profile.

After receiving the profile request, the profile server can identify, according to associated information (such as the device identity, a user identity, an EID, and an EIS) of the UE1 to which the LPA belongs and associated information (such as the device identity, a user identity, the EID, and the EIS) the UE2 to which the eUICC belongs that are in the profile request, that an object of the profile request is the eUICC of the UE2, and further generate or allocate, according to the capability information of the UE2, EID information of the UE2, or EIS information of the UE2, a profile matching the capability information of the UE2 or a profile matching the eUICC of the UE2. Obtaining a profile includes immediately generating, by the profile server, the profile when receiving the request of the eUICC for a profile, or allocating, by the profile server when receiving the request of the eUICC for a profile, a pre-stored profile to the eUICC that performs requesting.

Step S505: The profile server sends a key negotiation request to the LPA.

Before the profile server sends the key negotiation request to the LPA, the LPA may detect whether there is a secure channel between the LPA and the eUICC, or whether an established secure channel is disabled. If there is no secure channel or the established secure channel is disabled, the LPA re-establishes the secure channel.

Optionally, the key negotiation request may carry the EID of the eUICC of the UE2 such that the LPA determines that a target receiver of the key negotiation request is the eUICC.

For example, for the key negotiation request of the profile server, key negotiation with the eUICC may be completed by SM-DP using the LPA. The SM-DP may obtain information such as a public key, a private key, or a certificate of the eUICC from SM-SR.

Optionally, the key negotiation request may also carry a shared key (ShS) generated by the profile server, and the ShS is sent to the LPA after being encrypted using a public key in the received information about the eUICC.

Step S506: The LPA forwards the key negotiation request to the eUICC.

Optionally, the LPA forwards the key negotiation request to the eUICC according to the EID of the eUICC of the UE2 carried in the key negotiation request.

Step S507: The eUICC receives the key negotiation request, and obtains a key set (keyset) of a shared key.

Optionally, the eUICC decrypts and verifies the received ShS encrypted by the profile server. The eUICC may decrypt and calculate the ShS according to an obtained public key of the profile server, and verify the ShS to obtain a keyset.

Step S508: The eUICC sends a key negotiation response to the LPA. The key negotiation response may carry the private key of the eUICC. The LPA returns the key negotiation response to the profile server such that the profile server and the eUICC generate a keyset.

Step S509: The LPA forwards a key negotiation response to the profile server.

Step S5010: The profile server receives the key negotiation response, obtains the keyset including the ShS, and encrypts the profile.

Optionally, the profile server calculates the ShS, obtains the keyset, and uses a negotiated keyset to encrypt the profile.

Step S511: The profile server sends a profile request response to the LPA, where the profile request response includes at least the encrypted profile.

Further, for example, the profile server may include at least one of network devices such as MNO, SM-DS, SM-DP, and SM-SR. The profile request may be directly sent to the MNO, and the MNO sends, according to the profile request, a profile transmit message to corresponding SM-DP in order to generate a matching profile for or allocate a matching profile to the eUICC. The SM-DP sends the profile transmit message to corresponding SM-SR, and the SM-SR further sends the profile transmit message to the LPA of the UE1. The LPA forwards the profile transmit message to the eUICC of the UE2 according to information such as the EID and the UE2 ID related to the eUICC in the profile transmit message. The profile transmit message may be a create message of an ISD-P, a profile download message, or a profile data send message. For example, the MNO sends a profile download message to the SM-DP, the SM-DP sends one ISD-P create message to the SM-SR, and after the LPA forwards the ISD-P create message to the eUICC, the SM-DP sends a profile data send message to the SM-SR, and the LPA forwards the profile data send message to the eUICC. These cases are all within the protection scope.

Step S512: The LPA forwards the profile to the eUICC.

It can be learned that in the profile processing method described in FIG. 5, an LPA first generates a profile request according to information about an eUICC of a UE2, and sends the profile request to a profile server. Then, the LPA receives a profile request response sent by the profile server, and the profile request response includes a profile, encrypted by the profile server, of the eUICC. Finally, the LPA forwards the profile to the eUICC. The LPA belongs to a UE1, and the eUICC is disposed in the UE2. Therefore, it can be learned that by establishing a local connection between the LPA of the UE1 and the eUICC of the UE2, the LPA can conveniently and quickly manage the eUICC of the UE2, and directly download the profile for the eUICC of the UE2. This is conducive to profile processing efficiency enhancement of the eUICC and user experience improvement.

Figure 6:
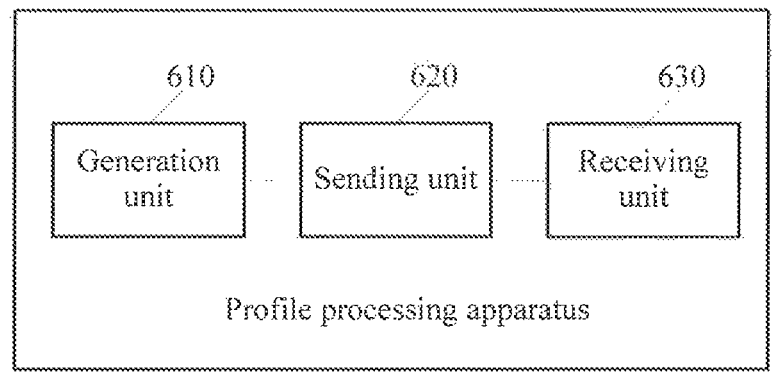
FIG. 6 shows a profile processing apparatus according to an embodiment of the present disclosure.

Referring to FIG. 6, an embodiment of the present disclosure further provides a profile processing apparatus. The profile processing apparatus may include a generation unit 610, a sending unit 620, and a receiving unit 630.

The generation unit 610 is configured to generate a profile request according to information about an eUICC of a UE2.

The information about the eUICC includes at least one of a UE2-ID, capability information of the UE2, an EID, or an EIS of the eUICC.

The sending unit 620 is configured to send the profile request generated by the generation unit 610.

In this embodiment of the present disclosure, a specific manner of sending, by the sending unit 620, the profile request generated by the generation unit 610 includes sending the profile request generated by the generation unit 610 to a profile server.

The profile request includes at least one of a UE1-ID, the UE2-ID, the capability information of the UE2, the EID, or the EIS of the eUICC.

The profile matches the capability information of the UE2.

The receiving unit 630 is configured to receive a profile request response, where the profile request response includes at least a profile of the eUICC.

Optionally, in this embodiment of the present disclosure, the receiving unit 630 is further configured to receive a key negotiation request sent by the profile server after the sending unit 620 sends the profile request and before the receiving unit 630 receives the profile request response.

The sending unit 620 is further configured to forward the key negotiation request to the eUICC when the profile processing apparatus determines, according to information carried in the key negotiation request, that a target receiver of the key negotiation request is the eUICC.

The receiving unit 630 is further configured to receive a key negotiation response sent by the eUICC.

The sending unit 620 is further configured to forward the key negotiation response to the profile server.

Optionally, in this embodiment of the present disclosure, the profile processing apparatus further includes an obtaining unit (not shown) configured to obtain the information about the eUICC, or an obtaining unit (not shown) configured to obtain the information about the eUICC, and a display unit (not shown) configured to display the obtained information about the eUICC and operator information.

Optionally, in this embodiment of the present disclosure, the profile processing apparatus further includes a channel establishment unit (not shown) configured to establish a secure channel between the profile processing apparatus and the eUICC before the obtaining unit obtains the information about the eUICC, where the secure channel is used to obtain the information about the eUICC.

Optionally, in this embodiment of the present disclosure, the channel establishment unit is further configured to establish a secure channel between the profile processing apparatus and the eUICC before the receiving unit 630 receives the profile request response, where the secure channel is used to transmit the profile.

Optionally, in this embodiment of the present disclosure, the channel establishment unit is further configured to re-establish a secure channel between the profile processing apparatus and the eUICC if the profile processing apparatus detects that the secure channel is disabled.

Optionally, in this embodiment of the present disclosure, the channel establishment unit is further configured to broadcast a service search request, establish a local connection between the LPA and the UE2 or between the LPA and the eUICC, and establish the secure channel between the profile processing apparatus and the eUICC based on the local connection, receive a broadcast service search request, establish a local connection between the LPA and the UE2 or between the LPA and the eUICC, and establish the secure channel between the profile processing apparatus and the eUICC based on the local connection, or receive a broadcast service search request carrying an eUICC service indicator, complete device discovery between the profile processing apparatus and the eUICC according to the service indicator, establish a local connection between the LPA and the UE2 or between the LPA and the eUICC, and establish the secure channel between the profile processing apparatus and the eUICC based on the local connection.

Optionally, in this embodiment of the present disclosure, a specific manner of forwarding, by the sending unit 620, the profile to the eUICC includes extracting the profile from the received profile request response, and forwarding the extracted profile to the eUICC, or forwarding, to the eUICC, the profile request response carrying the profile.

Optionally, in this embodiment of the present disclosure, after forwarding the profile to the eUICC, the sending unit 620 is further configured to send, to the eUICC, a profile activation request used to activate the profile, send, to the eUICC, a profile disabling request used to disable the profile, or send, to the eUICC, a profile delete request used to delete the profile.

Optionally, in this embodiment of the present disclosure, the generation unit 610 is further configured to generate the profile request according to the information about the eUICC when the profile processing apparatus detects an operator network selection instruction, where an operator network provides a network service to the eUICC.

It can be understood that functions of each functional module of the profile processing apparatus in this embodiment may be further implemented according to the method in the method embodiments. For a specific implementation process, refer to the related descriptions in the method embodiments. Details are not described again herein. Some or all functional modules of the profile processing apparatus may be implemented by a hardware circuit, or using a processor (such as a digital signal processor) by executing code or an instruction.

It can be learned from above that in this embodiment of the present disclosure, a profile processing apparatus of a UE1 first generates a profile request according to information about an eUICC of a UE2, and sends the profile request. Then, an LPA receives a profile request response, and the profile request response includes a profile, encrypted by a profile server, of the eUICC. Finally, the LPA forwards the profile to the eUICC. The LPA belongs to the UE1, and the eUICC is disposed in the UE2. Therefore, it can be learned that by establishing a local connection between the LPA of the UE1 and the eUICC of the UE2, the LPA can conveniently and quickly manage the eUICC of the UE2, and directly download the profile for the eUICC of the UE2. This is conducive to profile processing efficiency enhancement of the eUICC and user experience improvement.

Figure 7:
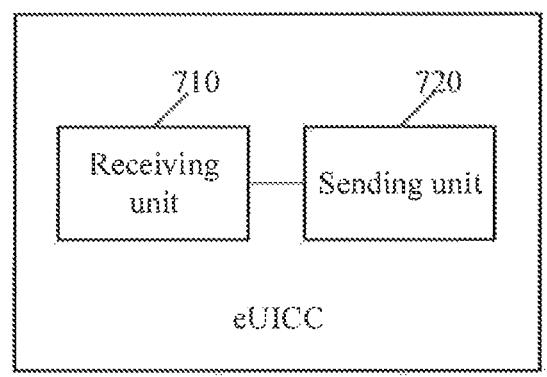
FIG. 7 shows an eUICC according to an embodiment of the present disclosure.

Referring to FIG. 7, an embodiment of the present disclosure further provides an eUICC. The eUICC may include a receiving unit 710 and a sending unit 720.

The receiving unit 710 is configured to receive a key negotiation request forwarded by an LPA of a UE1.

The sending unit 720 is configured to send a key negotiation response to the LPA.

The receiving unit 710 is further configured to receive a profile that is encrypted according to the key negotiation response and that is forwarded by the LPA.

Optionally, in this embodiment of the present disclosure, the sending unit 720 is further configured to send information about the eUICC to the LPA before the receiving unit 710 receives the key negotiation request forwarded by the LPA.

The information about the eUICC includes at least one of a UE2-ID, capability information of the UE2, an EID, or an EIS of the eUICC.

The profile matches the capability information of the UE2.

Optionally, in this embodiment of the present disclosure, the eUICC further includes a channel establishment unit (not shown) configured to establish a secure channel between the LPA and the eUICC before the sending unit 720 sends the information about the eUICC to the LPA, where the secure channel is used to send the information about the eUICC.

Optionally, in this embodiment of the present disclosure, the channel establishment unit is further configured to establish a secure channel between the LPA and the eUICC before the receiving unit 710 receives the profile that is encrypted according to the key negotiation response and that is forwarded by the LPA, where the secure channel is used to forward the profile.

Optionally, in this embodiment of the present disclosure, the eUICC further includes a channel disabling unit (not shown) configured to disable the secure channel if the eUICC detects that establishment duration of the secure channel is greater than or equal to a preset threshold after the channel establishment unit establishes the secure channel between the LPA and the eUICC.

Optionally, in this embodiment of the present disclosure, the channel establishment unit is further configured to re-establish the secure channel before the receiving unit 710 receives the profile that is encrypted according to the key negotiation response and that is forwarded by the LPA and if the eUICC detects that the secure channel is disabled.

Optionally, in this embodiment of the present disclosure, the channel establishment unit is further configured to receive a broadcast service search request, establish a local connection between the eUICC and the UE1 or between the eUICC and the LPA, and establish the secure channel between the LPA and the eUICC based on the local connection, broadcast a service search request, establish a local connection between the eUICC and the UE1 or between the eUICC and the LPA, and establish the secure channel between the LPA and the eUICC based on the local connection, or broadcast a service search request carrying an eUICC service indicator, establish a local connection between the eUICC and the UE1 or between the eUICC and the LPA, and establish the secure channel between the LPA and the eUICC based on the local connection, where the service indicator is used to complete device discovery between the LPA and the eUICC.

It can be understood that functions of each functional module of the eUICC in this embodiment may be further implemented according to the method in the method embodiments. For a specific implementation process, refer to the related descriptions in the method embodiments. Details are not described again herein. Some or all functional modules of the eUICC may be implemented by a hardware circuit, or using a processor (such as a digital signal processor) by executing code or an instruction.

It can be learned from above that in this embodiment of the present disclosure, an eUICC of UE2 first receives a key negotiation request forwarded by an LPA of a UE1, the eUICC then sends a key negotiation response to the LPA, and finally, the eUICC receives a profile that is encrypted according to the key negotiation response and that is forwarded by the LPA. The LPA is disposed in the UE1. Therefore, the eUICC of the UE2 can implement key negotiation between a profile server and the eUICC and download of the profile of the eUICC using the LPA of the UE1. This is conducive to profile processing efficiency enhancement of the eUICC and user experience improvement.

Figure 8:
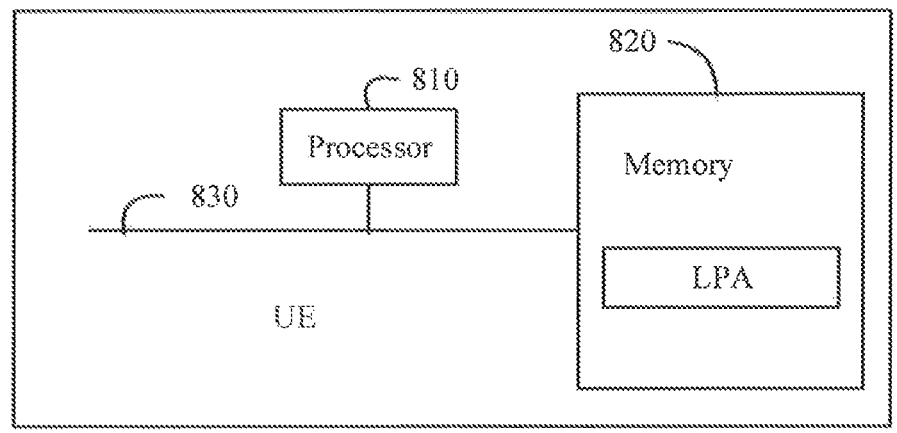
FIG. 8 shows a UE according to an embodiment of the present disclosure.

Referring to FIG. 8, an embodiment of the present disclosure further provides a UE. The UE includes an LPA and further includes a processor 810 and a memory 820.

The processor 810 and the memory 820 are coupled using a bus 830. The LPA uses the processor 810 to execute the steps of generating a profile request according to information about an eUICC of a UE2, sending the profile request, where in this embodiment of the present disclosure, a specific manner of sending, by the LPA, the profile request using the processor 810 includes sending the profile request to a profile server, receiving a profile request response, where the profile request response includes at least a profile of the eUICC, and forwarding the profile to the eUICC.

The profile request includes at least one of a UE1-ID, a UE2-ID, capability information of the UE2, an EID, or an EIS of the eUICC.

The profile matches the capability information of the UE2.

Optionally, in this embodiment of the present disclosure, after sending the profile request and before receiving the profile request response, the LPA uses the processor 810 to receive a key negotiation request sent by the profile server, forward the key negotiation request to the eUICC if determining, according to information carried in the key negotiation request, that a target receiver of the key negotiation request is the eUICC, and receive a key negotiation response sent by the eUICC, and forward the key negotiation response to the profile server.

Optionally, in this embodiment of the present disclosure, before generating the profile request according to the information about the eUICC of the UE2, the LPA uses the processor 810 to obtain the information about the eUICC, or obtain the information about the eUICC, and display the obtained information about the eUICC and operator information.

The information about the eUICC includes at least one of the UE2-ID, the capability information of the UE2, the EID, or the EIS of the eUICC.

Optionally, in this embodiment of the present disclosure, before the LPA uses the processor 810 to obtain the information about the eUICC, the LPA uses the processor 810 to establish a secure channel between the LPA and the eUICC, where the secure channel is used to obtain the information about the eUICC.

Optionally, in this embodiment of the present disclosure, before the LPA uses the processor 810 to receive the profile request response, the LPA uses the processor 810 to establish a secure channel between the LPA and the eUICC, where the secure channel is used to transmit the profile.

Optionally, in this embodiment of the present disclosure, when detecting that the secure channel is disabled, the LPA uses the processor 810 to re-establish a secure channel between the LPA and the eUICC.

Optionally, in this embodiment of the present disclosure, setting, by the LPA, the processor 810 to establish a secure channel between the LPA and the eUICC includes broadcasting a service search request, establishing a local connection between the LPA and the UE2 or between the LPA and the eUICC, and establishing the secure channel between the LPA and the eUICC based on the local connection, receiving a broadcast service search request, establishing a local connection between the LPA and the UE2 or between the LPA and the eUICC, and establishing the secure channel between the LPA and the eUICC based on the local connection, or receiving a broadcast service search request carrying an eUICC service indicator, completing device discovery between the LPA and the eUICC according to the service indicator, establishing a local connection between the LPA and the UE2 or between the LPA and the eUICC, and establishing the secure channel between the LPA and the eUICC based on the local connection.

Optionally, in this embodiment of the present disclosure, setting, by the LPA, the processor 810 to forward the profile to the eUICC includes extracting the profile from the received profile request response, and forwarding the extracted profile to the eUICC, or forwarding, to the eUICC, the profile request response carrying the profile.

Optionally, in this embodiment of the present disclosure, after the LPA uses the processor 810 to forward the profile to the eUICC, the processor 810 sends, to the eUICC, a profile activation request used to activate the profile, sends, to the eUICC, a profile disabling request used to disable the profile, or sends, to the eUICC, a profile delete request used to delete the profile.

Optionally, in this embodiment of the present disclosure, setting, by the LPA, the processor 810 to generate a profile request according to information about an eUICC of UE2 includes generating the profile request according to the information about the eUICC if an operator network selection instruction is detected, where an operator network provides a network service to the eUICC.

It can be understood that functions of each module of the UE in this embodiment may be further implemented according to the method in the method embodiments. For a specific implementation process, refer to the related descriptions in the method embodiments. Details are not described again herein.

It can be learned from above that in this embodiment of the present disclosure, an LPA first generates a profile request according to information about an eUICC of a UE2, and sends the profile request. Then, the LPA receives a profile request response, and the profile request response includes at least a profile of the eUICC. Finally, the LPA forwards the profile to the eUICC. The LPA belongs to a UE1, and the eUICC is disposed in the UE2. Therefore, it can be learned that the LPA can conveniently and quickly manage the eUICC of the UE2, and directly download the profile for the eUICC of the UE2. This is conducive to profile processing efficiency enhancement of the eUICC and user experience improvement.

Figure 9:
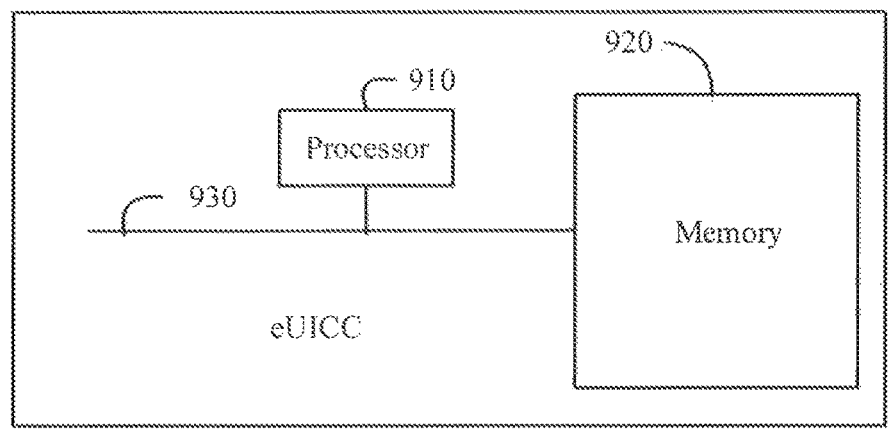
FIG. 9 shows another eUICC according to an embodiment of the present disclosure.

Referring to FIG. 9, an embodiment of the present disclosure further provides another eUICC. The eUICC is disposed in a UE2 and may include a processor 910 and a memory 920.

The processor 910 and the memory 920 are coupled using a bus 930, and the processor 910 may invoke code or an instruction in the memory 920 to execute the steps of receiving a key negotiation request forwarded by an LPA of a UE1, sending a key negotiation response to the LPA, and receiving a profile that is encrypted according to the key negotiation response and that is forwarded by the LPA.

Optionally, in this embodiment of the present disclosure, before the processor 910 receives the key negotiation request forwarded by the LPA, the processor 910 sends information about the eUICC to the LPA.

The information about the eUICC includes at least one of a UE2-ID, capability information of the UE2, an EID, or an EIS of the eUICC.

The profile matches the capability information of the UE2.

Optionally, in this embodiment of the present disclosure, before the processor 910 sends the information about the eUICC to the LPA, the processor 910 establishes a secure channel between the LPA and the eUICC, where the secure channel is used to send the information about the eUICC.

Optionally, in this embodiment of the present disclosure, before the processor 910 receives the profile that is encrypted according to the key negotiation response and that is forwarded by the LPA, the processor 910 establishes a secure channel between the LPA and the eUICC, where the secure channel is used to forward the profile.

Optionally, in this embodiment of the present disclosure, after the processor 910 establishes the secure channel between the LPA and the eUICC, the processor 910 disables the secure channel if the processor 910 detects that establishment duration of the secure channel is greater than or equal to a preset threshold.

Optionally, in this embodiment of the present disclosure, before the processor 910 receives the profile that is encrypted according to the key negotiation response and that is forwarded by the LPA, if the processor 910 detects that the secure channel is disabled, the processor 910 re-establishes the secure channel.

Optionally, in this embodiment of the present disclosure, establishing, by the processor 910, the secure channel includes receiving, by the processor 910, a broadcast service search request, establishing a local connection between the eUICC and the UE1 or between the eUICC and the LPA, and establishing the secure channel between the LPA and the eUICC based on the local connection, broadcasting, by the processor 910, a service search request, establishing a local connection between the eUICC and the UE1 or between the eUICC and the LPA, and establishing the secure channel between the LPA and the eUICC based on the local connection, or broadcasting, by the processor 910, a service search request carrying an eUICC service indicator, establishing a local connection between the eUICC and the UE1 or between the eUICC and the LPA, and establishing the secure channel between the LPA and the eUICC based on the local connection, where the service indicator is used to complete device discovery between the LPA and the eUICC.

It can be understood that functions of each module of the eUICC in this embodiment may be further implemented according to the method in the method embodiments. For a specific implementation process, refer to the related descriptions in the method embodiments. Details are not described again herein.

It can be learned from above that in this embodiment of the present disclosure, an eUICC of UE2 first receives a key negotiation request forwarded by an LPA of a UE2, the eUICC then sends a key negotiation response to the LPA, and finally, the eUICC receives a profile forwarded by the LPA. The LPA is disposed in a UE1. Therefore, the eUICC of the UE2 can implement key negotiation between a profile server and the eUICC and download of the profile of the eUICC using the LPA of the UE1. This is conducive to profile processing efficiency enhancement of the eUICC and user experience improvement.

Figure 10:
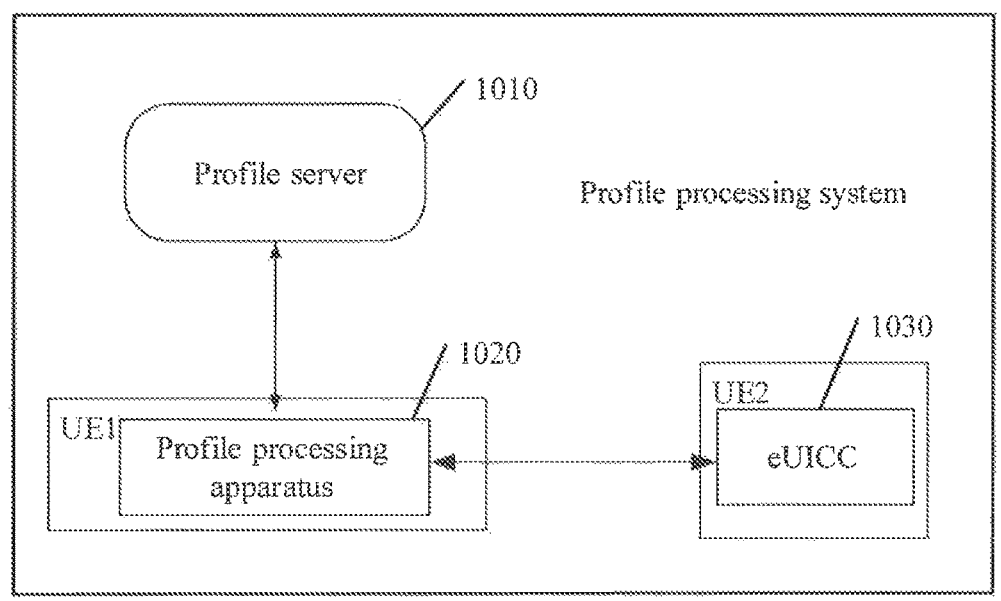
FIG. 10 shows a profile processing system according to an embodiment of the present disclosure.

Referring to FIG. 10, an embodiment of the present disclosure further provides a profile processing system. The profile processing system may include a profile server 1010, a UE1 including a profile processing apparatus 1020 or a UE including an LPA, and a UE2 including an eUICC 1030. The profile processing apparatus 1020 may be any LPA in the foregoing embodiments. The UE including an LPA may be any UE in the foregoing embodiments. The eUICC 1030 may be any eUICC in the foregoing embodiments.

It should be noted that, to make the description brief, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in the specification are example embodiments, and the related actions and modules are not necessarily mandatory to the present disclosure.

In the foregoing embodiments, the description of each embodiment has respective focuses. For a part that is not described in detail in an embodiment, reference may be made to related descriptions in other embodiments.

In the several embodiments provided in the present application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to other approaches, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present disclosure. The foregoing storage medium includes any medium that can store program code, such as a universal serial bus (USB) flash drive, a read-only memory (ROM), a random access memory (RAM), a removable hard disk, a magnetic disk, or an optical disc.

The foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present disclosure.

The invention claimed is:

1. A profile processing method, comprising:
   establishing, by a local profile assistant (LPA) of a first user equipment (UE1), a secure channel between the LPA and an embedded universal integrated circuit card (eUICC) of a second user equipment (UE2);
   subsequent to establishing the secure channel, generating, by the LPA, a profile request according to information about the eUICC;
   sending, by the LPA, the profile request to a profile server comprising a subscription manager-data preparation (SM-DP) server;
   receiving, by the LPA, a key negotiation request from the profile server;
   in response to receiving the key negotiation request from the profile server:
      determining, by the LPA according to information included in the key negotiation request, that a target receiver of the key negotiation request comprises the eUICC; and
      sending, by the LPA, the key negotiation request to the eUICC when the target receiver of the key negotiation request comprises the eUICC;
   receiving, by the LPA, a key negotiation response from the eUICC;
   sending, by the LPA, the key negotiation response to the profile server;
   subsequent to sending the profile request to the profile server, receiving, by the LPA from the profile server, a profile request response comprising at least a profile of the eUICC; and
   sending, by the LPA, the profile to the eUICC.

2. The profile processing method of claim 1, wherein the profile server is a mobile network operator (MNO).

3. The profile processing method of claim 1, wherein before generating the profile request, the method further comprises:
   obtaining, by the LPA, the information about the eUICC; or
   obtaining, by the LPA, the information about the eUICC, and displaying, by the LPA, the obtained information about the eUICC and operator information.

4. The profile processing method of claim 3, wherein the secure channel is established before obtaining the information about the eUICC, and wherein the method further comprises obtaining, by the LPA using the secure channel, the information about the eUICC.

5. The profile processing method of claim 3, wherein before receiving the profile request response, the method further comprises transmitting, by the LPA using the secure channel the profile.

6. The profile processing method of claim 4, further comprising re-establishing, by the LPA, a secure channel between the LPA and the eUICC when the LPA detects that the secure channel is disabled.

7. The profile processing method of claim 4, wherein establishing the secure channel between the LPA and the eUICC comprises:
   broadcasting, by the LPA, a service search request, establishing a local coupling between the LPA and the UE2 or between the LPA and the eUICC, and establishing the secure channel between the LPA and the eUICC based on the local coupling;
   receiving, by the LPA, a broadcast service search request, establishing the local coupling between the LPA and the UE2 or between the LPA and the eUICC, and establishing the secure channel between the LPA and the eUICC based on the local coupling; or
   receiving, by the LPA, a broadcast service search request carrying an eUICC service indicator, completing device discovery between the LPA and the eUICC according to the eUICC service indicator, establishing the local coupling between the LPA and the UE2 or between the LPA and the eUICC, and establishing the secure channel between the LPA and the eUICC based on the local coupling.

8. The profile processing method of claim 1, wherein the information about the eUICC comprises capability information of the UE2.

9. The profile processing method of claim 8, wherein the capability information of the UE2 comprises a memory capacity of the UE2 or a central processing unit clock speed of the UE2, and wherein the profile of the eUICC matches the capability information.

10. The profile processing method of claim 1, wherein the profile request comprises capability information of the UE2.

11. The profile processing method of claim 1, wherein sending the profile to the eUICC comprises:

extracting, by the LPA, the profile from the received profile request response, and sending the extracted profile to the eUICC; or sending, by the LPA to the eUICC, the profile request response carrying the profile.

12. The profile processing method of claim 1, wherein after sending the profile to the eUICC, the method further comprises:
sending, by the LPA to the eUICC, a profile activation request to activate the profile;
sending, by the LPA to the eUICC, a profile disabling request to disable the profile; or
sending, by the LPA to the eUICC, a profile delete request to delete the profile.

13. The profile processing method of claim 1, wherein generating the profile request comprises generating, by the LPA, the profile request according to the information about the eUICC in response to the LPA detecting an operator network selection instruction, and wherein an operator network provides a network service to the eUICC.

14. A profile processing method, comprising:
receiving, by an embedded universal integrated circuit card (eUICC) of a second user equipment (UE2), a key negotiation request from a local profile assistant (LPA) of a first user equipment (UE1);
sending, by the eUICC, a key negotiation response to the LPA; and
receiving, by the eUICC, a profile matching capability information indicating a capability of the second UE, wherein the capability comprises a memory capacity of the UE2 or a central processing unit clock speed of the UE2, and wherein the profile is encrypted according to the key negotiation response from the LPA such that only the UE2 can decrypt the profile.

15. The profile processing method of claim 14, wherein before receiving the key negotiation request from the LPA, the method further comprises sending, by the eUICC, information about the eUICC to the LPA.

16. The profile processing method of claim 15, wherein before sending the information about the eUICC to the LPA, the method further comprises:
establishing, by the eUICC, a secure channel between the LPA and the eUICC; and
sending, by the eUICC using the secure channel, the information about the eUICC to the LPA.

17. The profile processing method of claim 16, wherein after establishing the secure channel between the LPA and the eUICC, the method further comprises disabling, by the eUICC, the secure channel when the eUICC detects that establishment duration of the secure channel is greater than or equal to a preset threshold.

18. The profile processing method of claim 14, wherein before receiving the profile encrypted according to the key negotiation response from the LPA, the method further comprises:
establishing, by the eUICC, a secure channel between the LPA and the eUICC; and
receiving, by the eUICC using the secure channel, the profile.

19. The profile processing method of claim 18, wherein after establishing the secure channel between the LPA and the eUICC, the method further comprises disabling, by the eUICC, the secure channel when the eUICC detects that an establishment duration of the secure channel is greater than or equal to a preset threshold.

20. A first user equipment, comprising:
a local profile assistant (LPA);
a memory coupled to the LPA and configured to store instructions; and
a processor coupled to the LPA and the memory, wherein the instructions cause the processor to be configured to:
establish, by the LPA, a secure channel between the LPA and an embedded universal integrated circuit card (eUICC) of a second user equipment (UE2);
subsequent to establishing the secure channel, generate, using the LPA, a profile request according to information about the eUICC;
send the profile request to a profile server comprising a subscription manager-data preparation (SM-DP) server;
receive, by the LPA, a key negotiation request from the profile server;
in response to receiving the key negotiation request from the profile server:
determine, by the LPA according to information included in the key negotiation request, that a target receiver of the key negotiation request comprises the eUICC; and
send, by the LPA, the key negotiation request to the eUICC when the target receiver of the key negotiation request comprises the eUICC;
receive, by the LPA, a key negotiation response from the eUICC;
send, by the LPA, the key negotiation response to the profile server;
subsequent to sending the profile request to the profile server, receive, from the profile server, a profile request response comprising at least a profile of the eUICC; and
send the profile to the eUICC.

* * * * *